(12) United States Patent
Kusaka et al.

(10) Patent No.: US 9,183,456 B2
(45) Date of Patent: Nov. 10, 2015

(54) MEASUREMENT METHOD, MEASUREMENT APPARATUS, CAMERA, AND STORAGE MEDIUM HAVING STORED THEREIN COMPUTER PROGRAM

(71) Applicant: Panasonic Corporation, Osaka (JP)

(72) Inventors: Hiroya Kusaka, Hyogo (JP); Masamichi Ohara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/279,120

(22) Filed: May 15, 2014

(65) Prior Publication Data

US 2014/0247981 A1      Sep. 4, 2014

Related U.S. Application Data

(63) Continuation of application No. PCT/JP2012/007434, filed on Nov. 20, 2012.

(30) Foreign Application Priority Data

Nov. 22, 2011   (JP) ................. 2011-254563

(51) Int. Cl.
G06K 9/46      (2006.01)
H04N 5/357    (2011.01)
H04N 17/00    (2006.01)

(52) U.S. Cl.
CPC ............ *G06K 9/4652* (2013.01); *G06K 9/46* (2013.01); *G06K 9/4604* (2013.01); *H04N 5/3572* (2013.01); *H04N 17/002* (2013.01)

(58) Field of Classification Search
USPC ................................ 382/164, 165
See application file for complete search history.

(56) References Cited

U.S. PATENT DOCUMENTS

2002/0125441 A1   9/2002  Kamijo
2013/0051663 A1*  2/2013  Krishnaswamy et al. .... 382/164

FOREIGN PATENT DOCUMENTS

| JP | 63-094212 A   | 4/1988 |
| JP | 2002-270500 A | 9/2002 |
| JP | 2004-186789 A | 7/2004 |
| JP | 2008-289122 A | 11/2008 |
| JP | 2009-085694 A | 4/2009 |
| JP | 2009-211023 A | 9/2009 |
| JP | 2011-113526 A | 6/2011 |

OTHER PUBLICATIONS

International Search Report for corresponding International Application No. PCT/JP2012/007434 mailed Feb. 26, 2013.
Form PCT/ISA/237 for corresponding International Application No. PCT/JP2012/007434 dated Feb. 26, 2013.

* cited by examiner

*Primary Examiner* — Duy M Dang
(74) *Attorney, Agent, or Firm* — Renner, Otto, Boisselle & Sklar, LLP

(57) ABSTRACT

A method includes: acquiring a first level value in a first color area; acquiring a second level value in a second color area; calculating a first corrected level value by adding X % of a difference between the first level value and the second level value to the first level value; calculating a second corrected level value by subtracting Y % of the difference from the second level value; specifying a first corrected level position and a second corrected level position at a boundary between the first color area and the second color area; and measuring a bokeh amount of the image at the boundary between the first color area and the second color area by multiplying the distance between the specified first corrected level position and the specified second corrected level position by 100/(100−X−Y).

8 Claims, 24 Drawing Sheets

FIG. 9
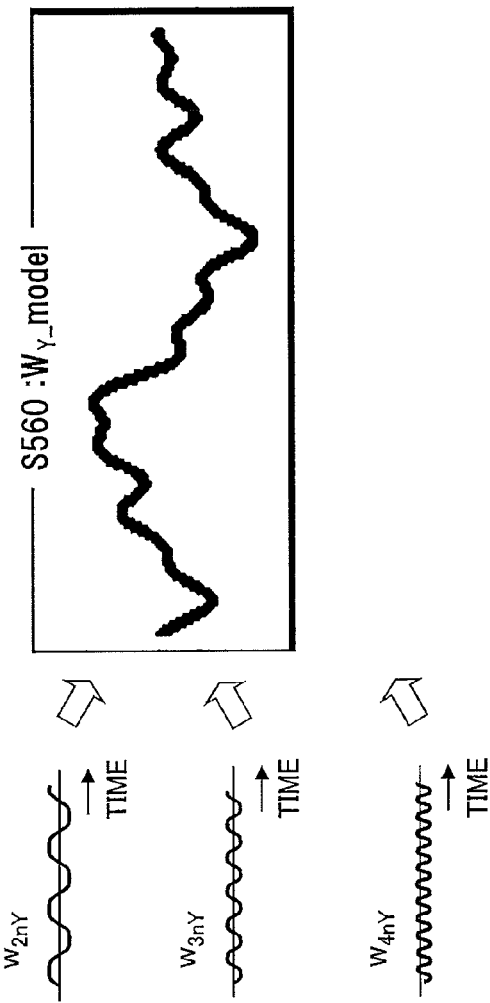
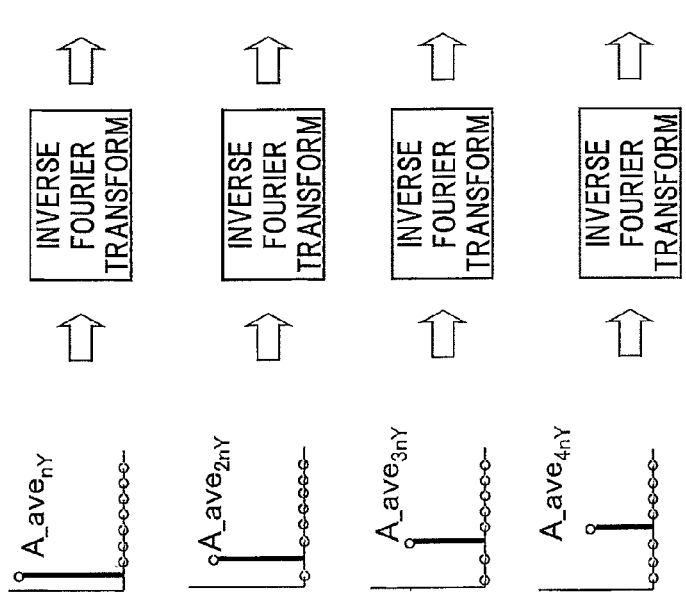

MEASUREMENT METHOD, MEASUREMENT APPARATUS, CAMERA, AND STORAGE MEDIUM HAVING STORED THEREIN COMPUTER PROGRAM

CROSS REFERENCE TO RELATED APPLICATION

The disclosure of International Patent Application No. PCT/JP2012/007434 filed on Nov. 20, 2012, which claims priority based on Japanese Patent Application No. 2011-254563 filed on Nov. 22, 2011 is incorporated herein by reference.

BACKGROUND OF THE INVENTION

1. Field of the Invention

The present disclosure relates to a measurement method, a measurement apparatus, a camera, and a computer readable recording medium having stored therein a measurement computer program for measuring a bokeh of an image.

2. Description of the Background Art

Japanese Laid-Open Patent Publication No. 2008-289122 discloses an evaluation method for an image in which a shaking table holding an imaging apparatus is shaken based on a model waveform, a predetermined object is imaged by the imaging apparatus with the shaking table being shaken, and the image taken by the imaging apparatus is evaluated. Here, the model waveform is generated by acquiring a plurality of pieces of vibration information about a vibration given to the imaging apparatus when a photographer takes an image of an object, and then performing statistic processing for frequency information of all or some of the acquired pieces of vibration information.

Japanese Laid-Open Patent Publication No. 2009-211023 discloses an evaluation method of calculating an evaluation value of the performance of an image stabilization function of a camera by using an image taken by a camera being shaken, with its image stabilization function being ON.

SUMMARY OF THE INVENTION

The present disclosure provides a measurement method and the like that can measure a bokeh of an image with a high accuracy.

In order to achieve the above object, a measurement method of the present disclosure includes: acquiring an image signal by imaging an object with a camera, the object including a first color area composed of a first color, and a second color area which is composed of a second color different from the first color and is adjacent to the first color area; acquiring a first level value that is the level value of the image signal in the first color area; acquiring a second level value that is the level value of the image signal in the second color area; calculating a difference between the first level value and the second level value; calculating a first corrected level value by adding X % of the calculated difference to the first level value; calculating a second corrected level value by subtracting Y % of the calculated difference from the second level value; specifying a first corrected level position and a second corrected level position at a boundary between the first color area and the second color area included in the acquired image signal, the first corrected level position being a position where the level value of the image signal is the first corrected level value, and the second corrected level position being a position where the level value of the image signal is the second corrected level value; calculating a distance between the specified first corrected level position and the specified second corrected level position; and measuring a bokeh amount of the image at the boundary between the first color area and the second color area by multiplying the calculated distance by 100/(100−X−Y).

Thus, the influence of noise of an image at the boundary between the first color area and the second color area can be excluded. Therefore, a bokeh amount of an image can be measured with a high accuracy.

Here, a level value indicated by the acquired image signal may be normalized with reference to a specific range, and the normalized level value may be used as the level value of the image signal.

Thus, even if the difference of the level value indicated by the acquired image signal among a plurality of color areas is small, the difference is enlarged by the normalization. Therefore, a bokeh amount of an image can be measured with a high accuracy.

It is noted that the measurement method of the present disclosure can be realized as a measurement apparatus or a computer program. In addition, the computer program realizing the measurement method of the present disclosure can be stored in a storage medium such as an optical disc, a memory card, a magnetic disk, a hard disk, or a magnetic tape.

In addition, the means for realizing the measurement method of the present disclosure may be stored in a camera. The means for realizing the measurement method of the present disclosure may be composed of a computer program, a wired logic, or the like.

Thus, in a camera, a bokeh amount of a taken image can be measured with a high accuracy.

The present disclosure is effective for measuring a bokeh amount of an image with a high accuracy.

BRIEF DESCRIPTION OF THE DRAWINGS

FIG. 9 is a schematic diagram for explaining a generation procedure for vibration data;

DESCRIPTION OF THE PREFERRED EMBODIMENTS

Hereinafter, embodiments will be described in detail by referring the drawings as necessary. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

(Embodiment 1)

[1. Configuration of Measurement System]

Figure 1:
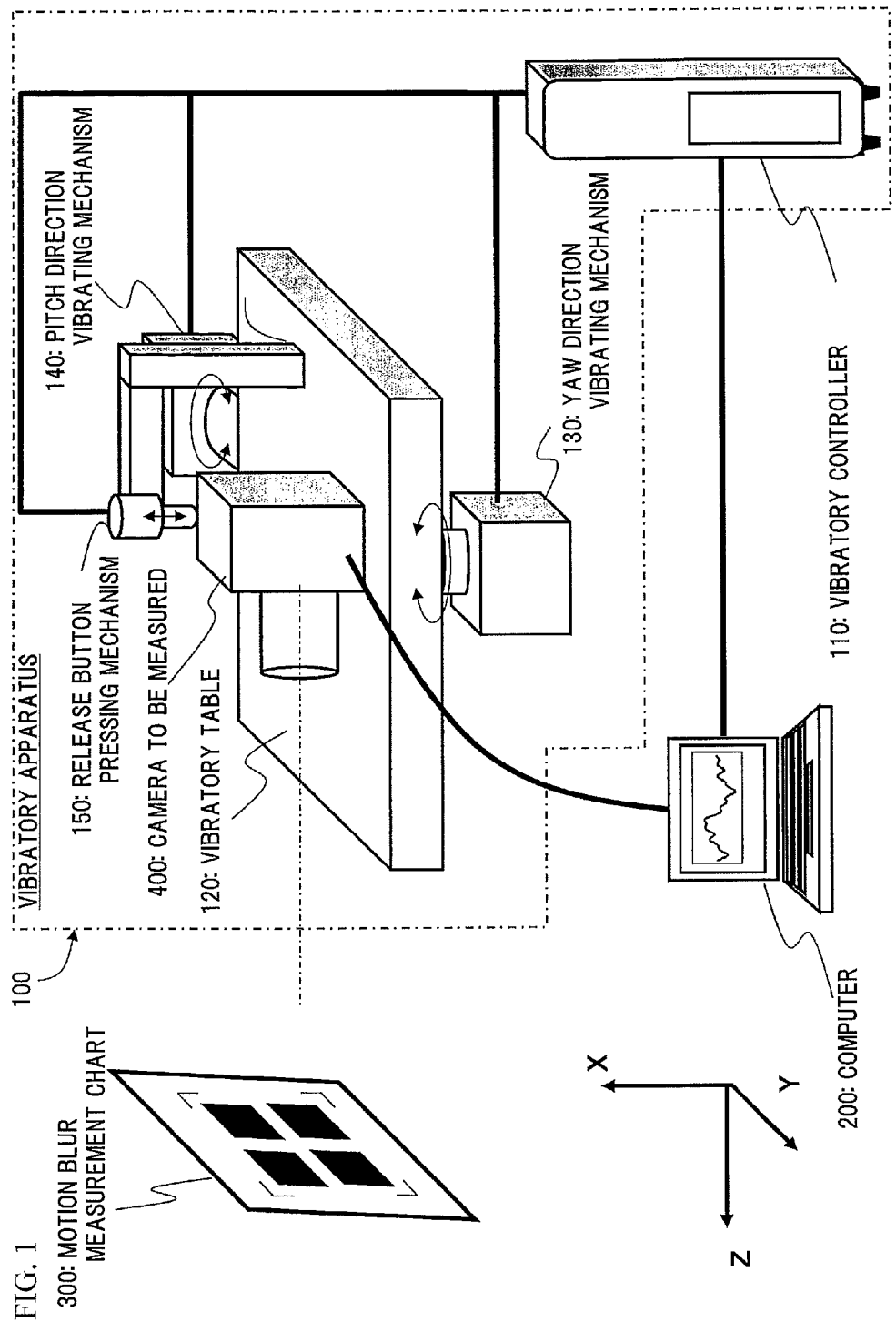
FIG. 1 is a schematic diagram showing the configuration of an evaluation system.

FIG. 1 is a block diagram showing the configuration of a measurement system according to embodiment 1.

The measurement system according to embodiment 1 is a system for measuring the performance of an image stabilization function of a camera 400 to be measured, by imaging a motion blur measurement chart 300 with the camera 400 to be measured in the state in which the camera 400 to be measured is fixed on a vibratory table 120 of a vibratory apparatus 100, and by analyzing the obtained image by a computer 200 camera 400 to be measured.

Here, a camera shake means that a camera moves because a hand holding the camera is unstable, resulting in subject shake in a shot image. In addition, the image stabilization function refers to a function of correcting a bokeh in an output image caused by the motion of a camera due to camera shake, by using the output of camera shake detection means. A motion blur amount is an amount corresponding to the movement of an object on a shot image caused by camera shake.

The vibratory apparatus 100 vibrates the vibratory table 120 by a pitch direction vibrating mechanism 140 and a yaw direction vibrating mechanism 130. The yaw direction vibrating mechanism 130 is a mechanism for giving a vibration around the X axis in FIG. 1. That is, the yaw direction vibrating mechanism 130 gives the vibratory table 120 a vibration simulating a camera shake in the horizontal direction around the vertical axis caused upon imaging by the camera 400 to be measured in a right posture. The vibration around the X axis is referred to as a yaw direction vibration. In addition, the pitch direction vibrating mechanism 140 is a mechanism for giving a vibration around the Y axis in FIG. 1. That is, the pitch direction vibrating mechanism 140 gives the vibratory table 120 a vibration simulating a camera shake in the vertical direction around the horizontal axis perpendicular to an optical axis upon imaging by the camera 400 to be measured in a right posture. The vibration around the Y axis is referred to as a pitch direction vibration.

The vibratory table 120 can fix the camera 400 to be measured by some means. For example, the camera 400 to be measured may be fixed by screw fastening, or may be fixed by an adhesive tape. Any fixing means may be used but it is necessary that the fixing is not easily released when a vibration is given to the camera 400 to be measured. The vibratory table 120 transmits the vibration given by the yaw direction vibrating mechanism 130 and the pitch direction vibrating mechanism 140, to the camera 400 to be measured.

A release button pressing mechanism 150 is for pressing a release button 471 of the camera 400 to be measured. The release button pressing mechanism 150 may be composed of a solenoid mechanism, for example. It is noted that in embodiment 1, the release button 471 is mechanically pressed by the release button pressing mechanism 150, to perform shutter release of the camera 400 to be measured. However, the shutter release may be performed by another method. For example, the camera 400 to be measured itself may perform release by an electric signal being transmitted to the camera 400 to be measured via wire or wirelessly. Alternatively, an evaluator may manually press the release button 471. Still alternatively, in the case of mechanically pressing the release button 471 by the release button pressing mechanism 150, a vibration due to the pressing may be applied to the camera 400 to be measured.

A vibratory controller 110 controls the entire vibratory apparatus 100 including the yaw direction vibrating mechanism 130, the pitch direction vibrating mechanism 140, the release button pressing mechanism 150, and the like.

The computer 200 is, for example, a personal computer, and performs transmission and reception of a signal with the vibratory apparatus 100 and the camera 400 to be measured. The computer 200 gives information about shutter release or vibration data to the vibratory controller 110, and acquires a shot image from the camera 400 to be measured. Transmission and reception of a signal between the computer 200 and the vibratory apparatus 100 or the camera 400 to be measured may be performed via wire or wirelessly. In addition, acquisition of a shot image from the camera 400 to be measured may be performed by wired or wireless communication or via a memory card.

[1-1. Motion Blur Measurement Chart]

Figure 2:
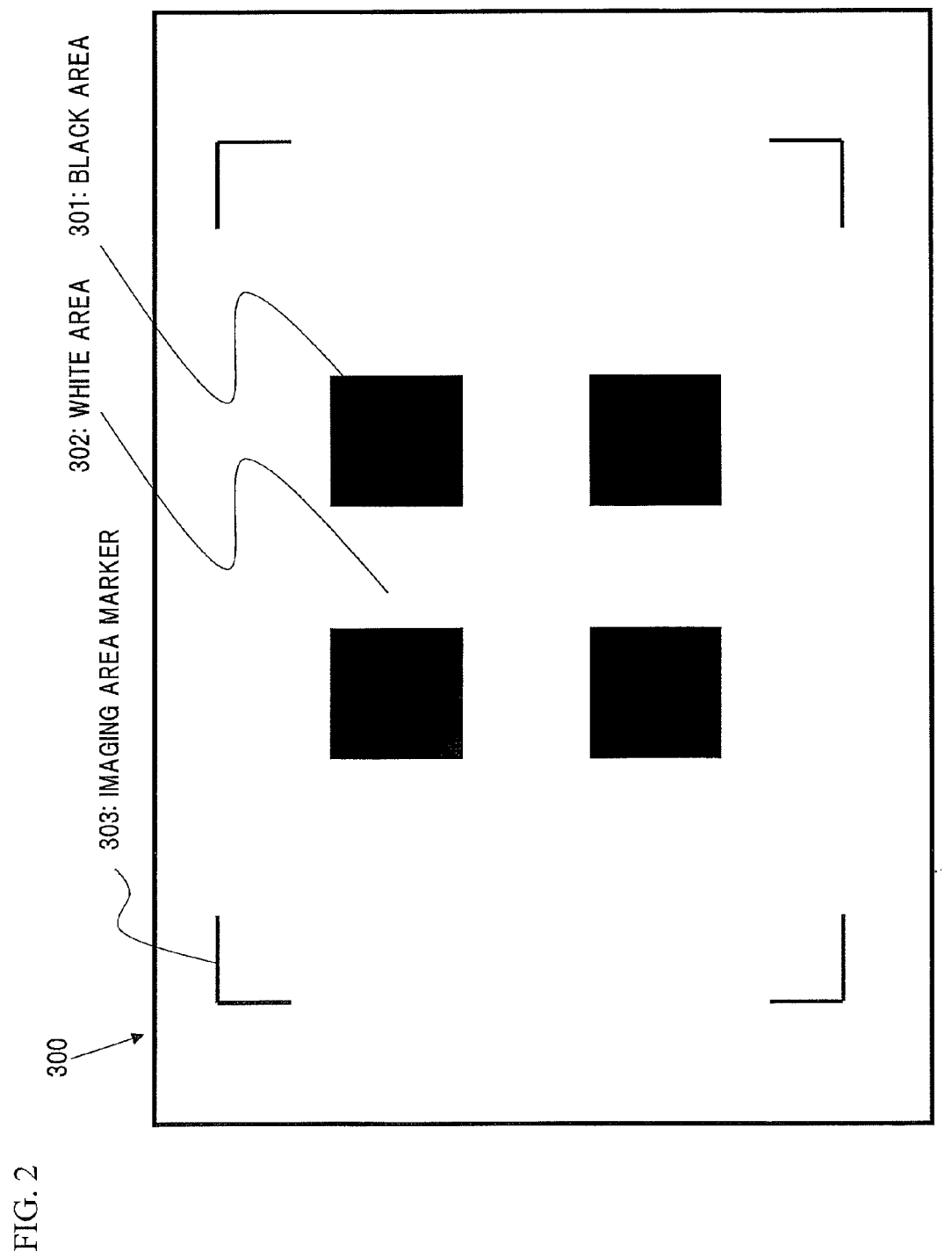
FIG. 2 is a plane view of a motion blur measurement chart.

FIG. 2 shows an example of a motion blur measurement chart 300. The motion blur measurement chart 300 is a chart used as an object to be imaged upon measurement of the image stabilization performance. A black area 301 is an area colored in black. A white area 302 is an area colored in white. An imaging area marker 303 is a marker used as a reference for setting an imaging area. The motion blur measurement chart 300 is not limited to that shown in FIG. 2 but various types may be applied thereto. For example, instead of a combination of black and white, the motion blur measurement chart 300 may be a pattern composed of several kinds of color areas having chroma. Alternatively, instead of such a geometric pattern, the motion blur measurement chart 300 may be a pattern partially including a real picture. In essence, the motion blur measurement chart may be a chart including a plurality of color areas. In embodiment 1, a bokeh amount of an image is evaluated by measuring a bokeh of the image at the boundary between different color areas of the motion blur measurement chart. Here, color of the color area is a concept including black, gray, and white which have no chroma and also including colors having chroma. In addition, a bokeh refers to a phenomenon in which the sharpness of a shot image reduces due to displacement between the focus plane of a lens and an imaging plane of an imaging device, camera shake, or the like. The bokeh can occur due to image processing for image data. A bokeh amount refers to a value obtained by quantifying the magnitude of a bokeh.

[1-2. Example of Camera to be Measured]

Figure 3:
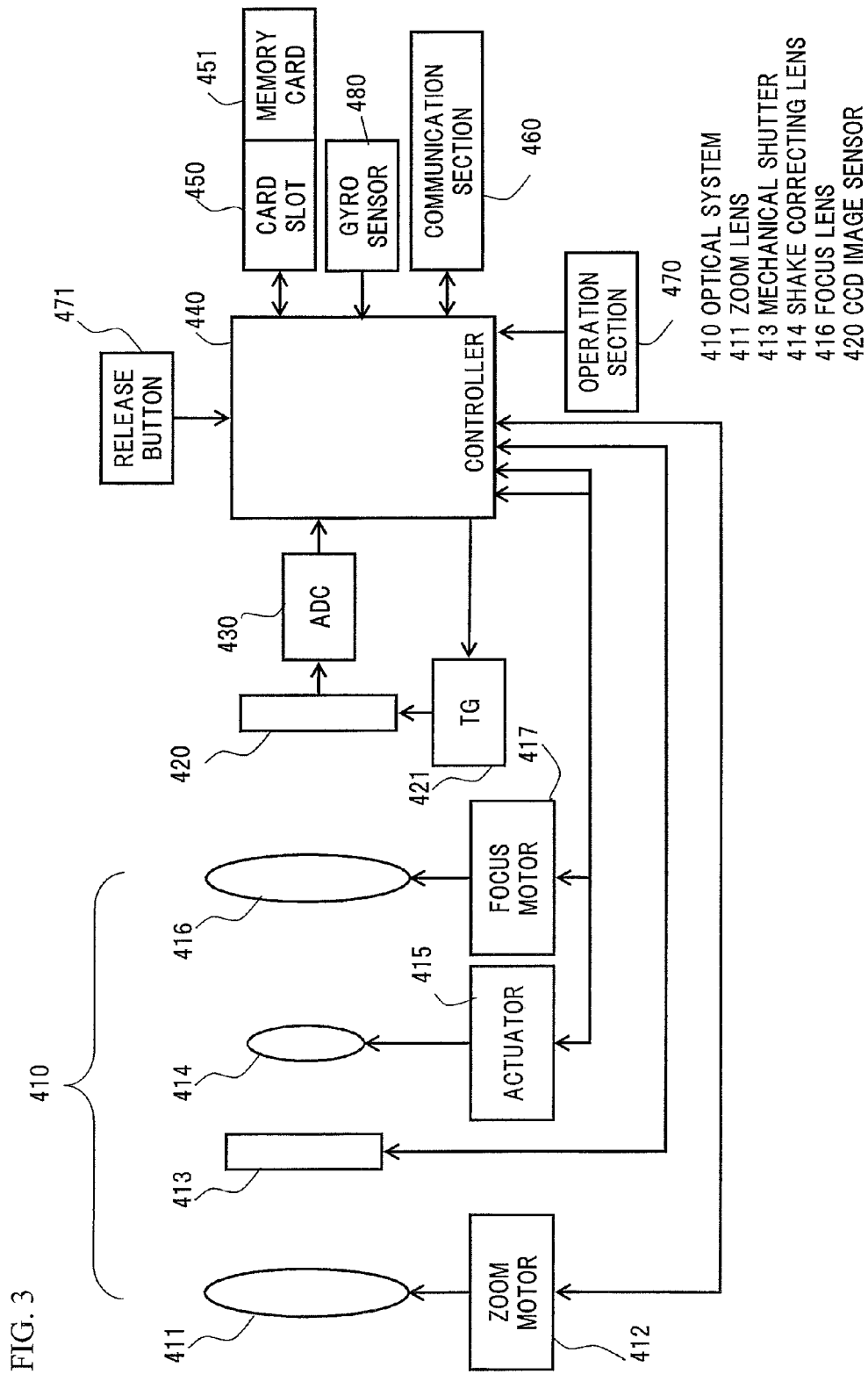
FIG. 3 is a block diagram showing the configuration of a camera to be measured.

FIG. 3 is a block diagram showing an exemplary configuration of the camera to be measured. The camera 400 to be measured generates image data by a CCD image sensor 420 taking an object image formed in an optical system 410.

The optical system 410 includes a zoom lens 411, a mechanical shutter 413, a camera shake correcting lens 414, a focus lens 416, and the like. The zoom lens 411 is movable along the optical axis of the optical system 410, and can change the focal length by the movement. A zoom motor 412 drives the zoom lens 411 along the optical axis. The mechanical shutter 413 transmits or shuts off light entering the CCD image sensor 420 upon imaging, in accordance with control from the controller 440. The length of time during which the light is transmitted upon imaging is referred to as a shutter speed or an exposure time. The camera shake correcting lens 414 moves on a plane perpendicular to the optical axis, whereby a subject shake on an image formed on the CCD image sensor 420 plane can be reduced. Therefore, owing to the camera shake correcting lens 414, the camera 400 to be measured has an image stabilization function. Here, since the image stabilization function of the camera 400 to be measured is realized by the camera shake correcting lens 414, in other words, it can be said that the camera 400 to be measured is a camera having an optical image stabilization function of an inner lens shift type. An actuator 415 drives the camera shake correcting lens 414 on a plane perpendicular to the optical axis. The focus lens 416 is movable along the optical axis, and can change the focus state of an object image by the movement. A focus motor 417 drives the focus lens 416 along the optical axis.

The CCD image sensor 420 generates image data by taking an object image formed by the optical system 410. A timing generator 421 transmits a synchronization signal to the CCD image sensor 420 in accordance with an instruction from the controller 440. By variously changing the synchronization signal, the operation of the CCD image sensor 420 is controlled. An AD converter 430 converts image data generated by the CCD image sensor 420 from an analog signal to a digital signal.

The controller 440 controls the whole camera 400 to be measured. The controller 440 can be realized by a microcomputer, for example. In addition, the controller 440 may be composed of one semiconductor tip or may be composed of a semiconductor tip for realizing an image processing section and a semiconductor tip for realizing an operation control section.

A card slot 450 allows a memory card 451 to be attached thereto, and performs transmission and reception of data with the memory card 451. A communication section 460 performs transmission and reception of data with the computer 200. An operation section 470 is composed of a cross key, a press button, a touch panel, or the like, and is a member for making various settings of the camera 400 to be measured. The release button 471 is an operation member for giving an instruction for shutter release to the controller 440 by a pressing operation from a user.

A gyro sensor 480 is a sensor for measuring an angular velocity. By fixing the gyro sensor 480 on the camera 400 to be measured, the amount of a vibration given to the camera 400 to be measured can be measured. Based on information from the gyro sensor 480, the controller 440 controls the actuator 415 so as to drive the camera shake correcting lens 414 in a direction that cancels the camera shake. Thus, the image stabilization function of the camera 400 to be measured is realized.

It is noted that the camera 400 to be measured described above is merely an example of a camera to be measured. Besides the camera 400 to be measured, the measurement method according to embodiment 1 can apply to measurement of the performance of an image stabilization function of various cameras as long as the camera has an image stabilization function. For example, although the camera 400 to be measured is a camera provided with a zoom lens, a single-focus camera may be used. In addition, although the camera 400 to be measured is a camera having an optical image stabilization function of an inner lens shift type, the measurement method according to embodiment 1 is also applicable to a camera having an optical image stabilization function of another type such as an imaging device shift type, and to a camera having an electronic image stabilization function instead of the optical image stabilization function. In addition, although the camera 400 to be measured is a camera having a built-in lens unit, a camera with interchangeable lenses such as a single-lens reflex camera may be used. In this case, instead of evaluation of only a camera itself, a camera system including the interchangeable lenses is evaluated. In addition, although the camera 400 to be measured is a camera that performs exposure by a mechanical shutter, a camera that performs exposure by an electronic shutter may be used. In addition, although in the above description, a simple configuration has been shown as the configuration of the optical system 410 for facilitating the description, the optical system may include more lenses. In essence, any camera to be measured having such an image stabilization function may be used. The measurement method according to embodiment 1 mainly uses a still image as an evaluation target. As a matter of course, since a moving image is collection of still images, also a moving image can be evaluated by evaluating individual still images composing the moving image by the measurement method according to embodiment 1.

It is noted that, as described above, the measurement method according to embodiment 1 is also applicable to a camera having an electronic image stabilization function. However, there are various types of electronic image stabilization functions, and the circumstance differs depending on each type. Then, the electronic image stabilization function will be briefly described below.

First, as camera shake measurement means, for example, means for measuring a camera shake by a sensor, such as a gyro sensor, attached on a camera in order to detect a camera shake or means for measuring a camera shake by analyzing an image shot with a camera are conceivable. In the case of means for analyzing an image shot with a camera, it is desirable that the motion blur measurement chart includes a pattern containing a real picture as well as a geometric pattern. In this case, it is desirable to use a chromatic pattern having a high chroma rather than an achromatic pattern. This is because it becomes easy to recognize a feature point in a shot image.

Next, as camera shake correcting means, for example, means for reducing blurring of a shot image by image processing, or means for taking a plurality of images with a short exposure time and then combining the shot images while changing an area to be cut from the shot images are conceivable.

In either of the above electronic image stabilization methods, the measurement method according to embodiment 1 is applicable. Specifically, procedures such as an evaluation value calculation procedure taking a bokeh offset amount into consideration and, a motion blur amount measurement procedure of actually measuring a distance in a specific level range and estimating a bokeh amount at the boundary between different color areas based on the measurement, are applicable to a camera of either of the above electronic image stabilization types.

[1-3. Vibratory Apparatus]

Figure 4:
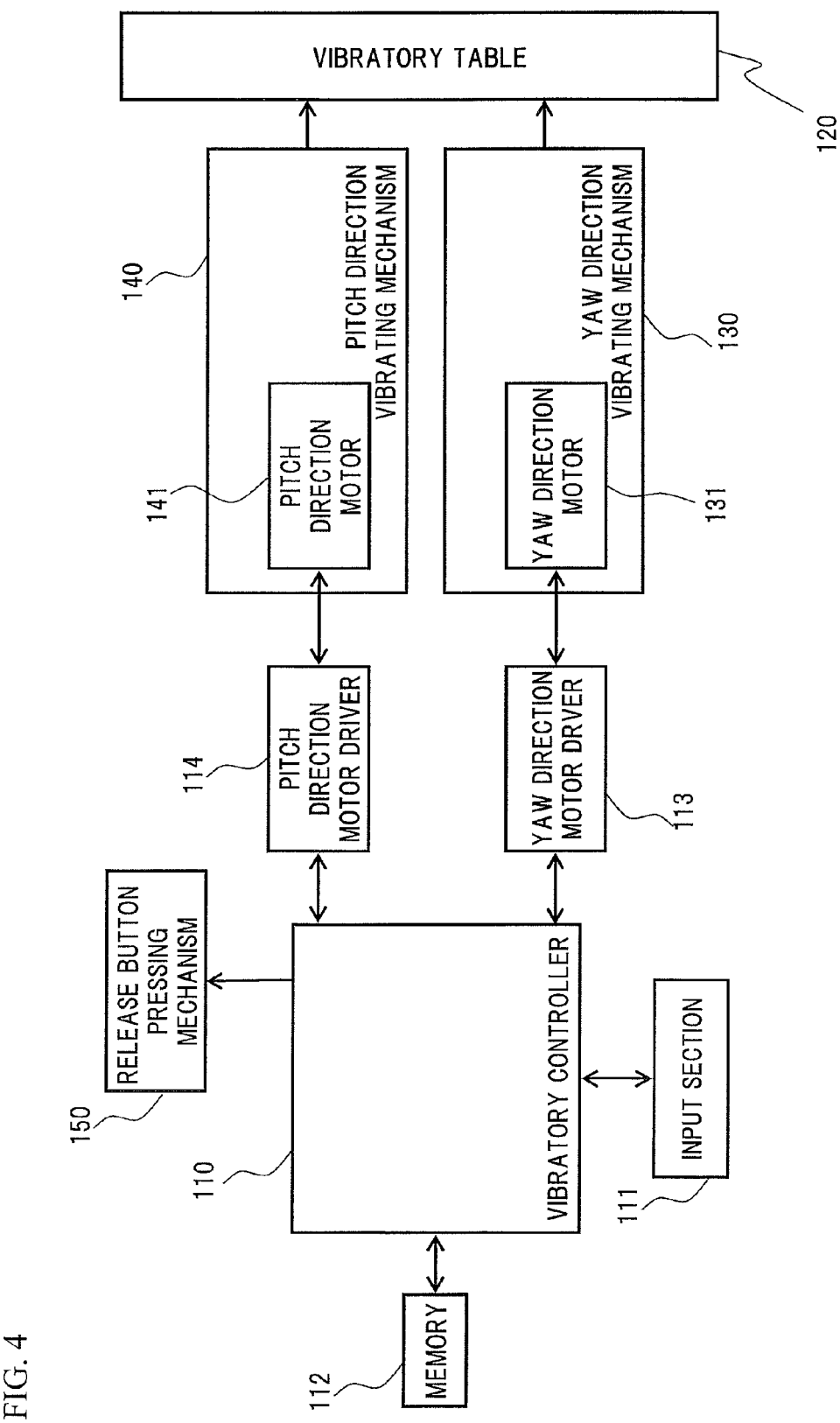
FIG. 4 is a block diagram showing the configuration of a vibratory apparatus.

FIG. 4 is a block diagram showing the configuration of the vibratory apparatus 100.

The vibratory controller 110 performs transmission and reception with the computer 200 via an input section 111. The vibratory controller 110 receives vibration data and the like from the computer 200, and feeds back the operation status of the vibratory apparatus 100 to the computer 200. Upon control of the vibratory apparatus 100, the vibratory controller 110 uses a memory 112 as a working memory. The vibration data transmitted from the computer 200 is stored into the memory 112. By referring to vibration data stored in the memory 112, the vibratory controller 110 controls a pitch direction motor driver 114 and a yaw direction motor driver 113.

The pitch direction motor driver 114 controls a pitch direction motor 141. The pitch direction vibrating mechanism 140 includes a mechanical component such as a rotational shaft, besides the pitch direction motor 141. In addition, the operation of the pitch direction motor 141 is fed back to the vibratory controller 110 via the pitch direction motor driver 114.

The yaw direction motor driver 113 controls a yaw direction motor 131. The yaw direction vibrating mechanism 130 includes a mechanical component such as a rotational shaft, besides the yaw direction motor 131. In addition, the operation of the yaw direction motor 131 is fed back to the vibratory controller 110 via the yaw direction motor driver 113

The vibratory controller 110 controls the release button pressing mechanism 150 in accordance with an instruction from the computer 200.

[1-4. Vibration Data]

Figure 5:
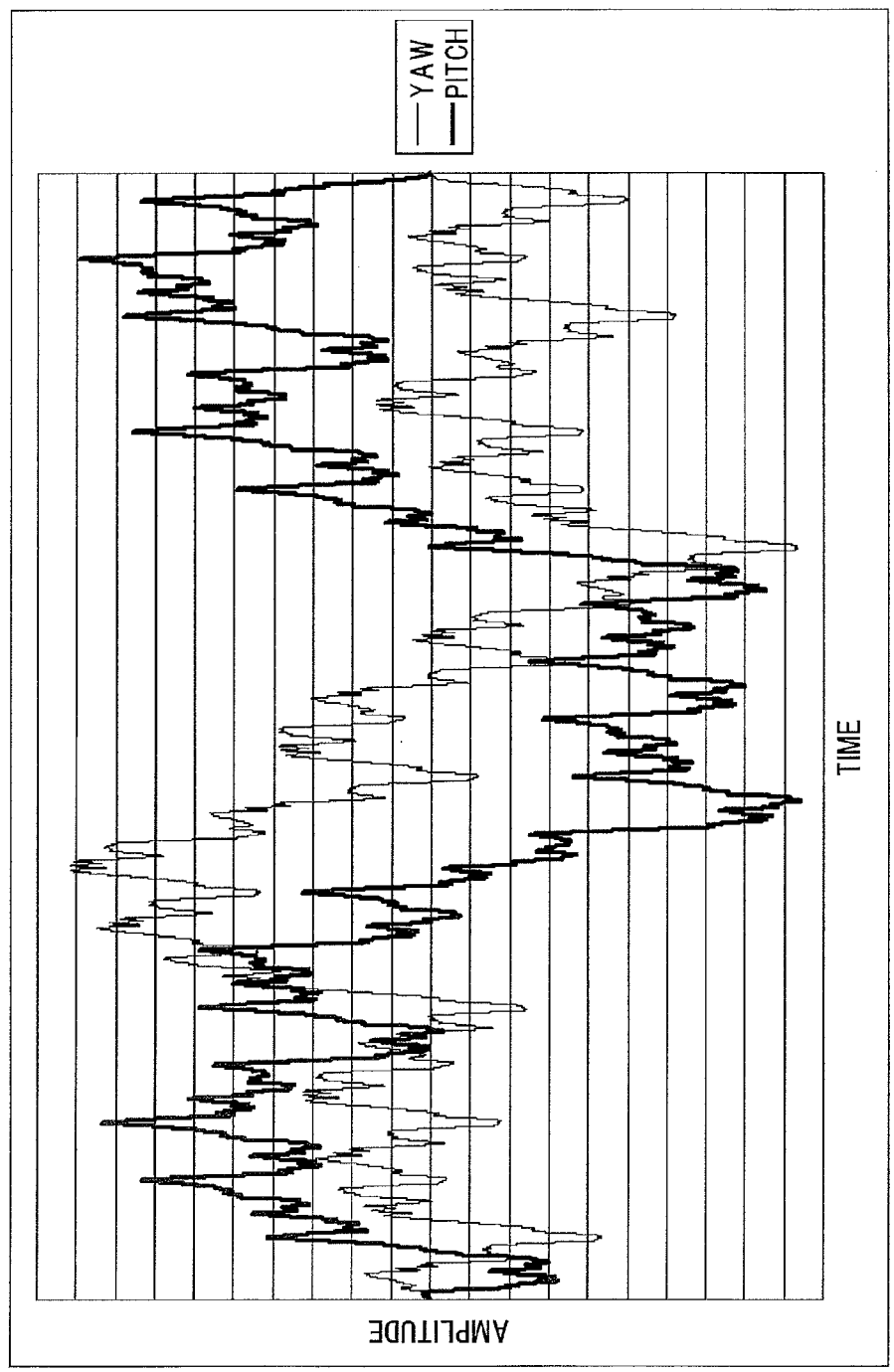
FIG. 5 is a graph showing an example of vibration data for a camera having a small mass.
Figure 6:
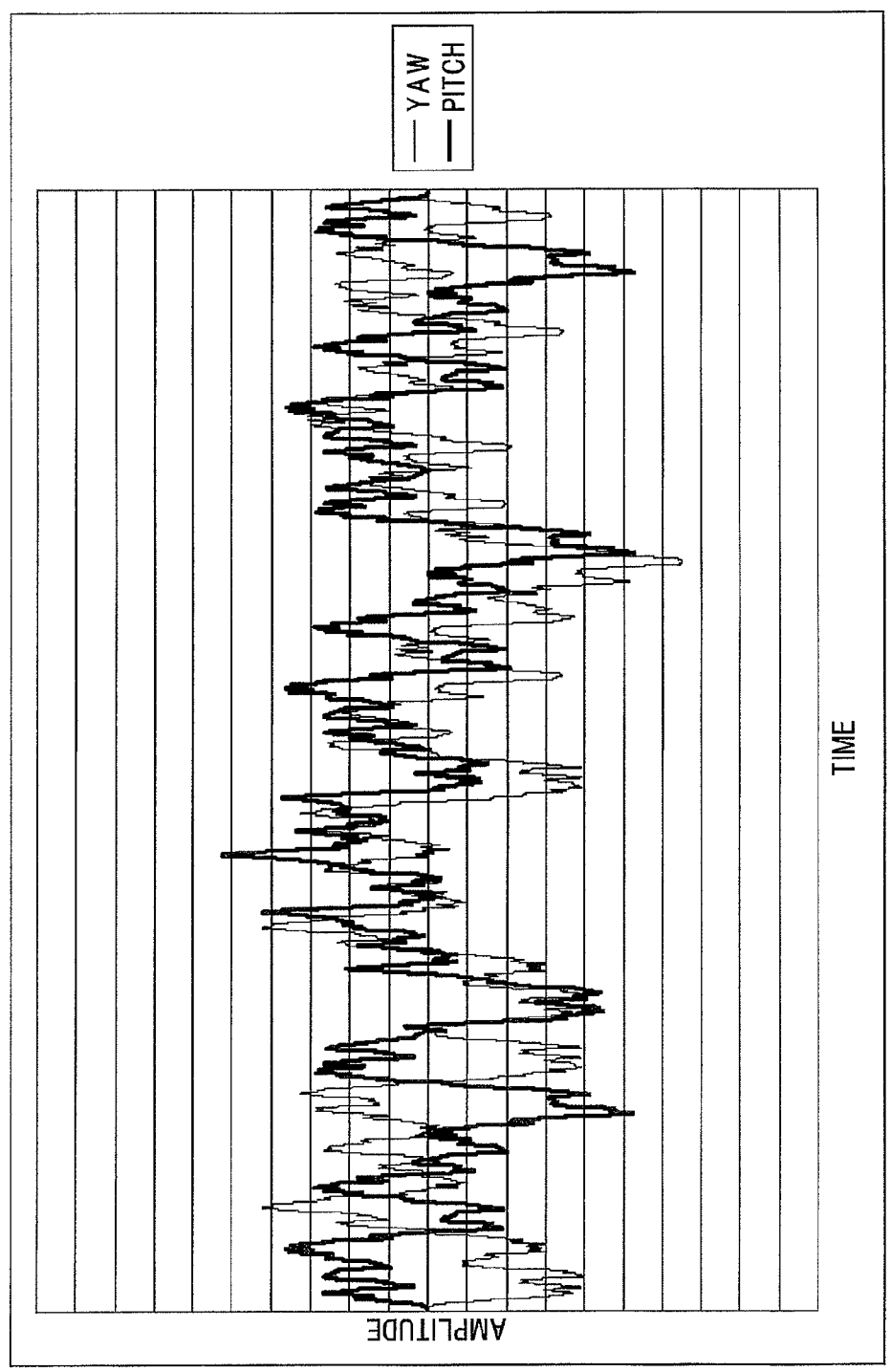
FIG. 6 is a graph showing an example of vibration data for a camera having a large mass.

FIGS. 5 and 6 are waveform diagrams showing examples of vibration data sent from the computer 200 to the vibratory apparatus 100. The horizontal axis indicates time and the vertical axis indicates amplitude. FIG. 5 shows vibration data (for convenience, this vibration data is referred to as first vibration data) used for measuring a camera having a mass smaller than a first mass. FIG. 6 shows vibration data (for convenience, this vibration data is referred to as second vibration data) used for measuring a camera having a mass larger than a second mass. The second mass is equal to or larger than the first mass. In each of FIGS. 5 and 6, vibration data in the yaw direction and vibration data in the pitch direction are both indicated.

In the measurement method of embodiment 1, when the mass of the camera 400 to be measured is smaller than the first mass, the first vibration data shown in FIG. 5 is selected, and meanwhile, when the mass of the camera 400 to be measured is larger than the second mass, the second vibration data shown in FIG. 6 is selected. In essence, in accordance with the mass of the camera 400 to be measured, one of several kinds of vibration data is selected. Then, the vibratory table 120 of the vibratory apparatus 100 is vibrated in accordance with the selected vibration data. Next, while the vibratory table 120 is being vibrated, the motion blur measurement chart 300 is imaged by the camera 400 to be measured to acquire an evaluation image, and a motion blur amount in the image is measured based on the acquired evaluation image.

As is obvious from FIGS. 5 and 6, the magnitude of the amplitude in a low frequency region normalized by the magnitude of the amplitude in a high frequency region in the first vibration data shown in FIG. 5 is larger than that in the second vibration data shown in FIG. 6. This is to take into consideration the fact that, in the case of taking an image with a light camera, a camera shake component with a low frequency becomes large because the camera is light and a photographer usually holds a camera with the eyes away from a back-side monitor upon taking an image. On the other hand, in the case of a heavy camera, in the first place, camera shake of a low frequency hardly occurs because the camera is heavy. In addition to this, in the case of a heavy camera, the fact that a photographer usually takes an image with the eyes close to a peep-type viewfinder is also taken into consideration.

Figure 7:
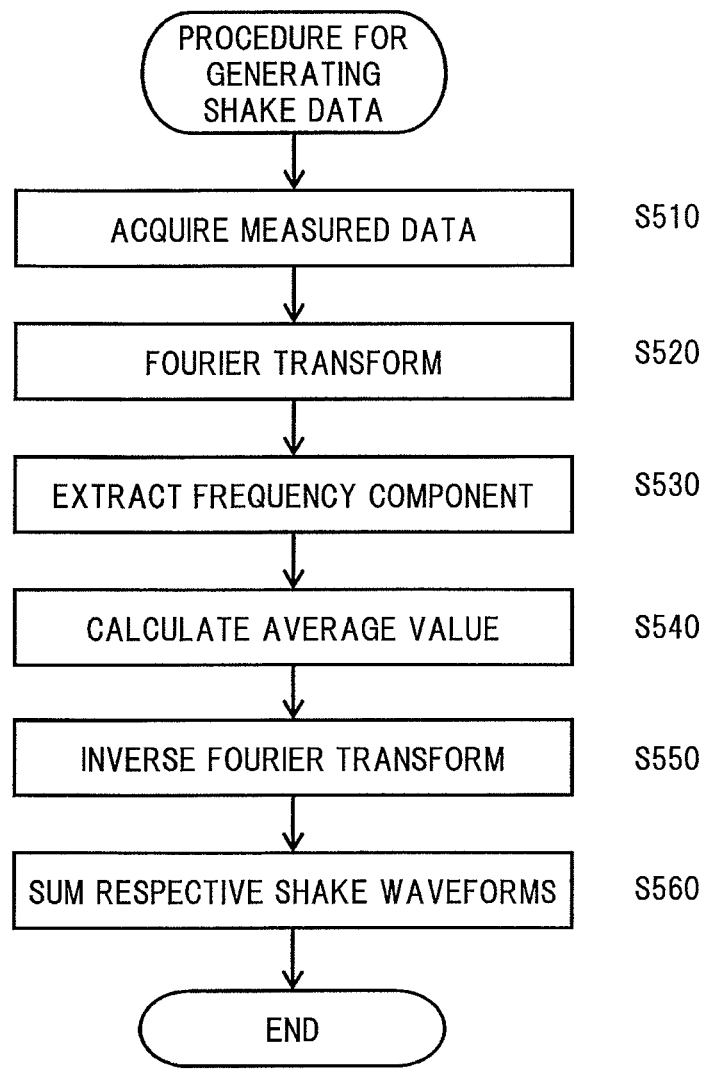
FIG. 7 is a flowchart showing a procedure for generating vibration data.
Figure 8:
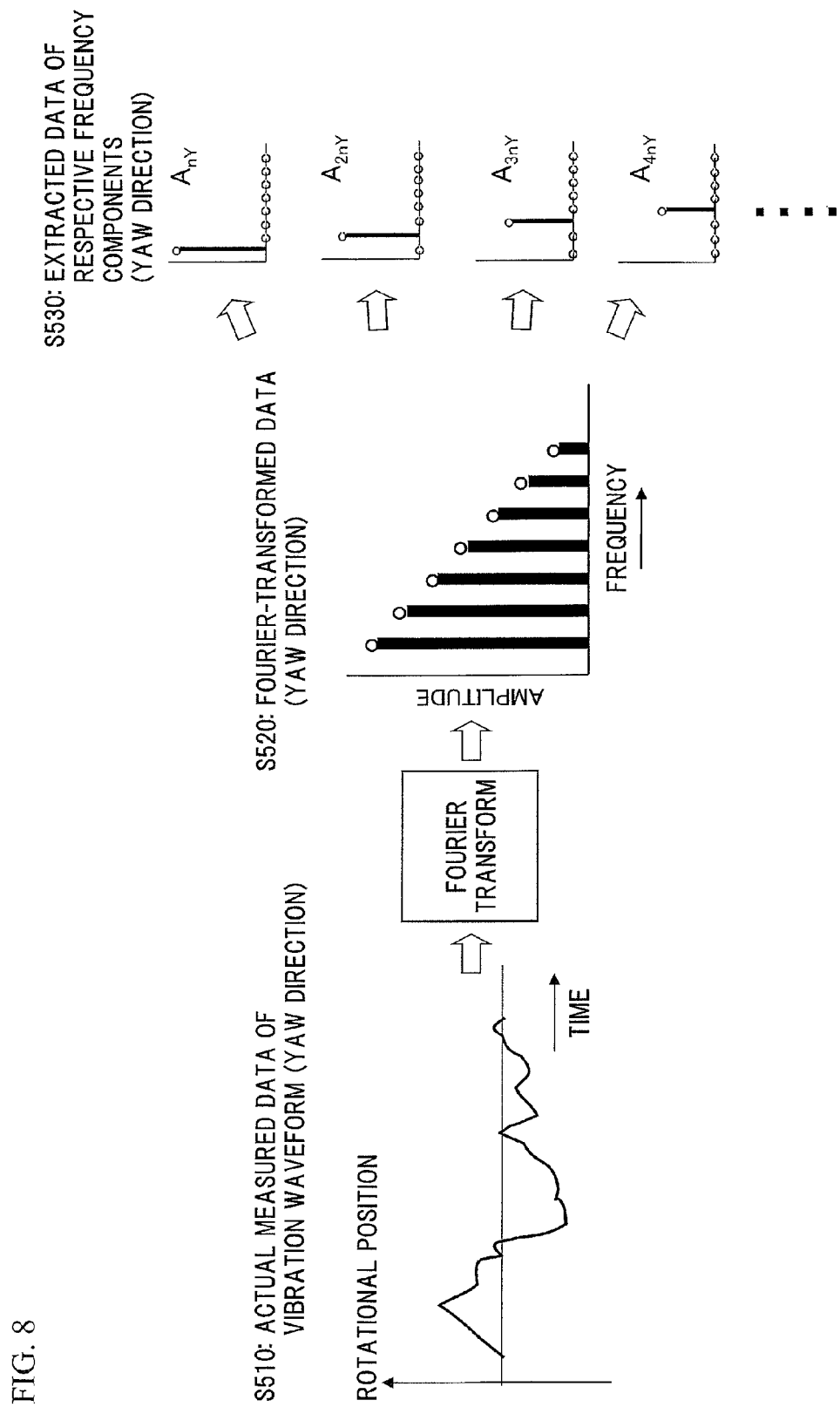
FIG. 8 is a schematic diagram for explaining a procedure for generating vibration data.

Next, a procedure for generating the vibration data shown in FIGS. 5 and 6 will be described with reference to FIGS. 7 to 9. FIG. 7 is a flowchart showing a procedure for generating the vibration data. FIGS. 8 and 9 are conceptual diagrams showing the content of each processing step of the generation procedure.

First, measured data of a vibration waveform (camera shake waveform) applied to a camera due to camera shake at the time of imaging is acquired (S510). For example, a gyro sensor is attached on the camera, and then a photographer actually performs an imaging operation. Specifically, a photographer performs a pressing operation for a release button, holding the camera with the hand. Then, from the output of the gyro sensor at the time of imaging, measured data of vibration waveforms in the yaw direction and the pitch direction is acquired. At this time, the output of the gyro sensor is an angular velocity of the vibration waveform applied to the camera. Therefore, by integrating the angular velocity, a vibration waveform of the camera converted into angle can be acquired. Here, the time of imaging is a certain period including a release timing.

The purpose of acquisition of measured data of a camera shake waveform is to obtain data as a base for generating the first vibration data or the second vibration data. Therefore, it is desirable to acquire data based on as many photographers as possible and as many imaging scenes as possible.

Next, the measured data of the camera shake waveform in each of the yaw direction and the pitch direction is converted into frequency-amplitude data (S520). This conversion is performed by Fourier transform.

Next, the data in the yaw direction and the pitch direction after Fourier transform is divided into frequency component data (S530). For example, if frequencies are divided into bands at intervals of 1 Hz by Fourier transform, the first amplitude data An indicates an amplitude component in a frequency band of 1 Hz±0.5 Hz, and A2n indicates an amplitude component of 2 Hz±0.5 Hz. Since the frequency band of camera shake is about 20 Hz at the highest, the data may be extracted up to that frequency. The processing of steps S520 and S530 is performed for all the pieces of measured data of the camera shake waveforms that have been acquired.

Next, based on all the pieces of yaw direction data processed by the steps up to S530, the average value of amplitude data is calculated for each frequency component data to obtain $A_{13}$ avenY, A_ave2nY, etc. (S540). Also for the pitch direction, A_avenP, A_ave2nP, etc. are calculated in the same manner (S540).

Next, inverse Fourier transform is performed for A_avenY, A_ave2nY, etc. which are the average values of the amplitude data of respective frequency component data for the yaw direction, thereby calculating vibration waveforms WnY, W2nY, etc. in respective specific bands for the yaw direction (S550). Also for the pitch direction, vibration waveforms WnP, W2nP, etc. are calculated in the same manner (S550).

Finally, the vibration waveforms WnY, W2nY, etc. in the respective specific bands for the yaw direction are summed to generate a camera shake model waveform WY_model for the yaw direction (S560). Upon summing the vibration waveforms WnY, W2nY, etc. in the respective specific bands, they are summed with their phases being shifted randomly. Also for the pitch direction, a camera shake model waveform WP_model is generated in the same manner (S560). Upon summing the vibration waveforms in the respective specific bands for the pitch direction, the same phase amounts as those used in the shifting for the yaw direction may be used, or other phase amounts may be used. Vibration data indicating these model waveforms is the first vibration data or the second vibration data.

Thus, since the first vibration data and the second vibration data are obtained by performing statistic processing for measured data about a vibration, vibration data simulating a real vibration can be obtained.

[1-5. Configuration of Computer]

Figure 10:
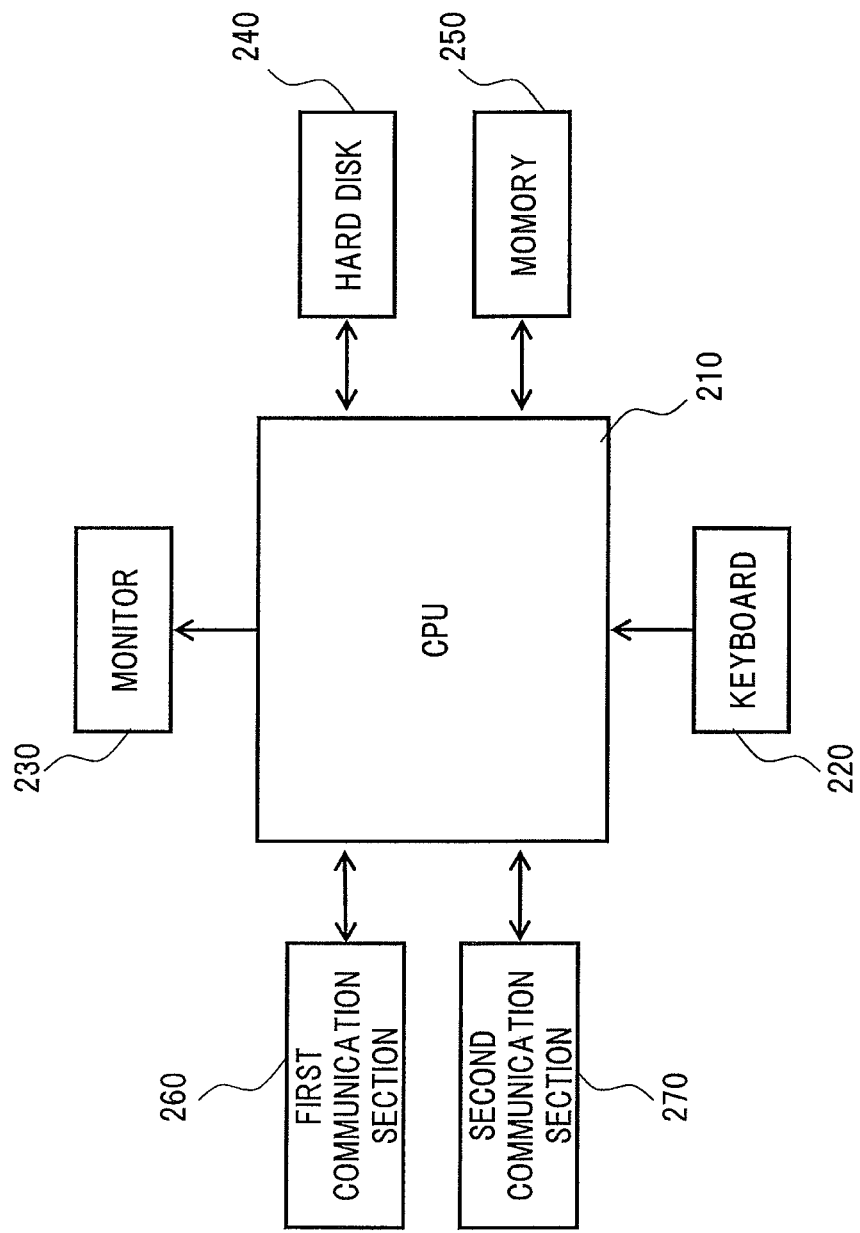
FIG. 10 is a block diagram showing the configuration of a computer.

FIG. 10 is a block diagram showing the configuration of the computer 200.

A CPU 210 controls a monitor 230, a hard disk 240, a memory 250, a first communication section 260, and a second communication section 270 in accordance with an instruction from a keyboard 220. The first communication section 260 is connected to the camera 400 to be measured and performs transmission and reception of data with the camera 400 to be measured. The second communication section 270 is connected to the vibratory apparatus 100 and performs transmission and reception of data with the vibratory apparatus 100. The first communication section 260 and the second communication section 270 may be a wired connection unit such as a USB or a wireless connection unit, for example.

The CPU 210 may be configured to acquire information about the settings of the camera 400 to be measured such as the focal length and the shutter speed value, from the camera 400 to be measured via the first communication section 260. In addition, the CPU 210 may be configured to acquire image data from the camera 400 to be measured via the first communication section 260. In addition, the CPU 210 may be configured to transmit a signal indicating a shutter release instruction to the camera 400 to be measured via the first communication section 260.

The hard disk 240 stores two kinds of vibration data shown in FIGS. 5 and 6. The hard disk 240 stores software such as a motion blur measurement software 500 and an evaluation value calculation software 600 described later. Such software is realized as a computer program. A computer program indicating such software may be stored in an optical disc and be installed into the computer 200 from the optical disc, or a computer program indicating such software may be stored into the hard disk 240 via a network and then installed into the computer 200. The software stored into the hard disk 240 is loaded onto the memory 250 as necessary, to be executed by the CPU 210. The computer program for realizing such software can be stored into a storage medium such as a memory card, a magnetic disk, or a magnetic tape, besides an optical disc or a hard disk.

The CPU 210 transmits vibration data stored in the hard disk 240 to the vibratory apparatus 100 via the second communication section 270. In addition, the CPU 210 receives a signal indicating the operation state of the vibratory apparatus 100 from the vibratory apparatus 100 via the second communication section 270.

The CPU 210 uses the memory 250 as a working memory. The monitor 230 displays a calculation result and the like obtained by the CPU 210.

[1-6. Configurations of Motion Blur Measurement Software and Evaluation Value Calculation Software]

Figure 11:
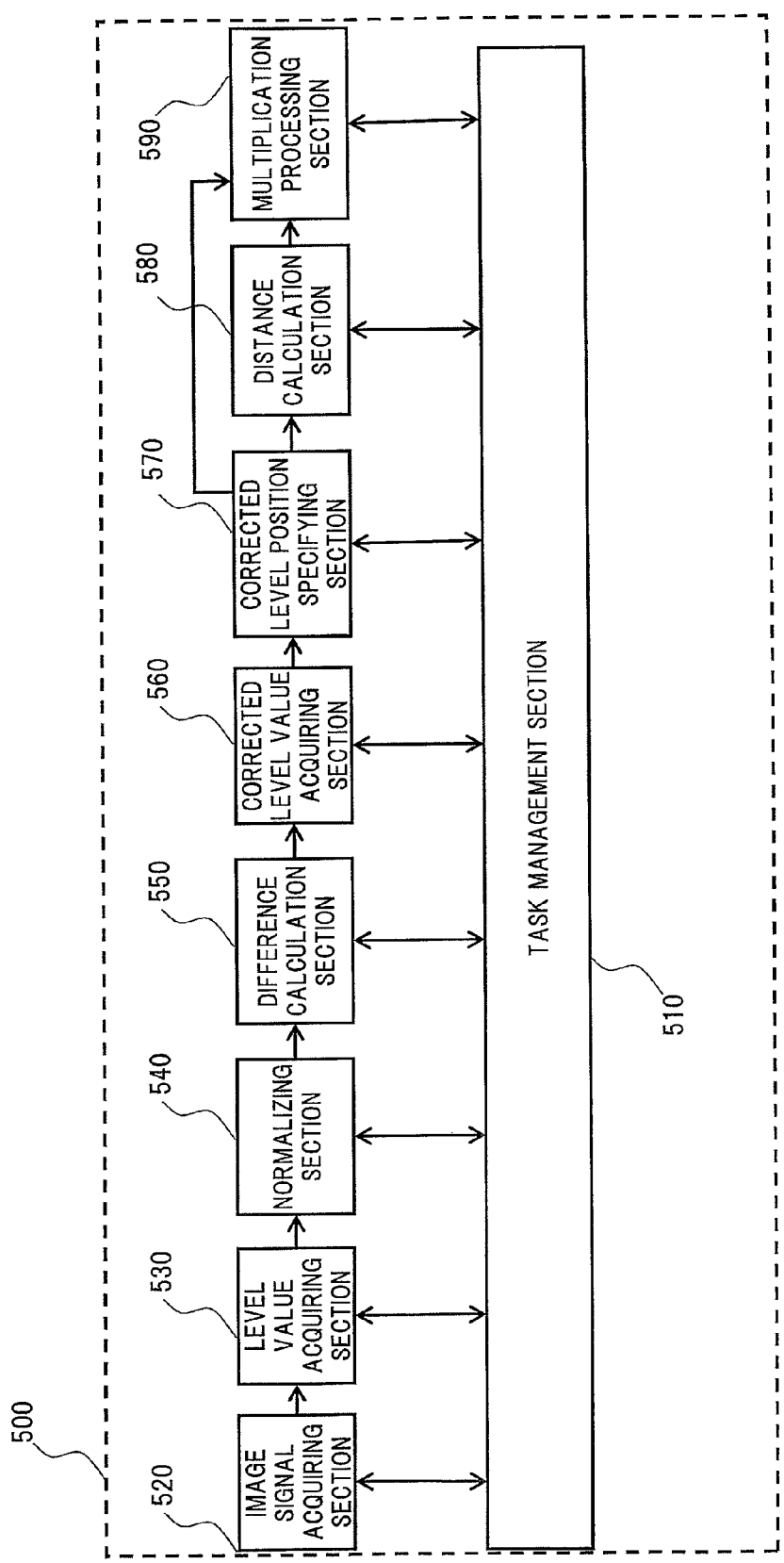
FIG. 11 is a block diagram showing the configuration of motion blur measurement software.

FIG. 11 is a block diagram showing the configuration of the motion blur measurement software 500. The motion blur measurement software 500 is software for measuring a bokeh offset amount and a measured comprehensive bokeh amount from an image obtained by imaging the motion blur measurement chart 300. Here, the bokeh offset amount is a bokeh amount of a shot image due to a factor other than camera shake, and specifically, is a numerical value that is unique to each device and that depends on the optical performance, effective pixels, image processing, and the like of the camera 400 to be measured. In addition, the measured comprehensive bokeh amount is a measured value of a bokeh amount of an image taken with the image stabilization function being ON, when the camera 400 to be measured is vibrated based on a vibration waveform (waveform indicated by the vibration data). A task management section 510 performs overall task management. The processing contents of blocks from an image signal acquiring section 520 to a multiplication processing section 590 will be described later, together with the description of a camera shake measurement procedure (FIG. 16) which will be also described later.

Figure 12:
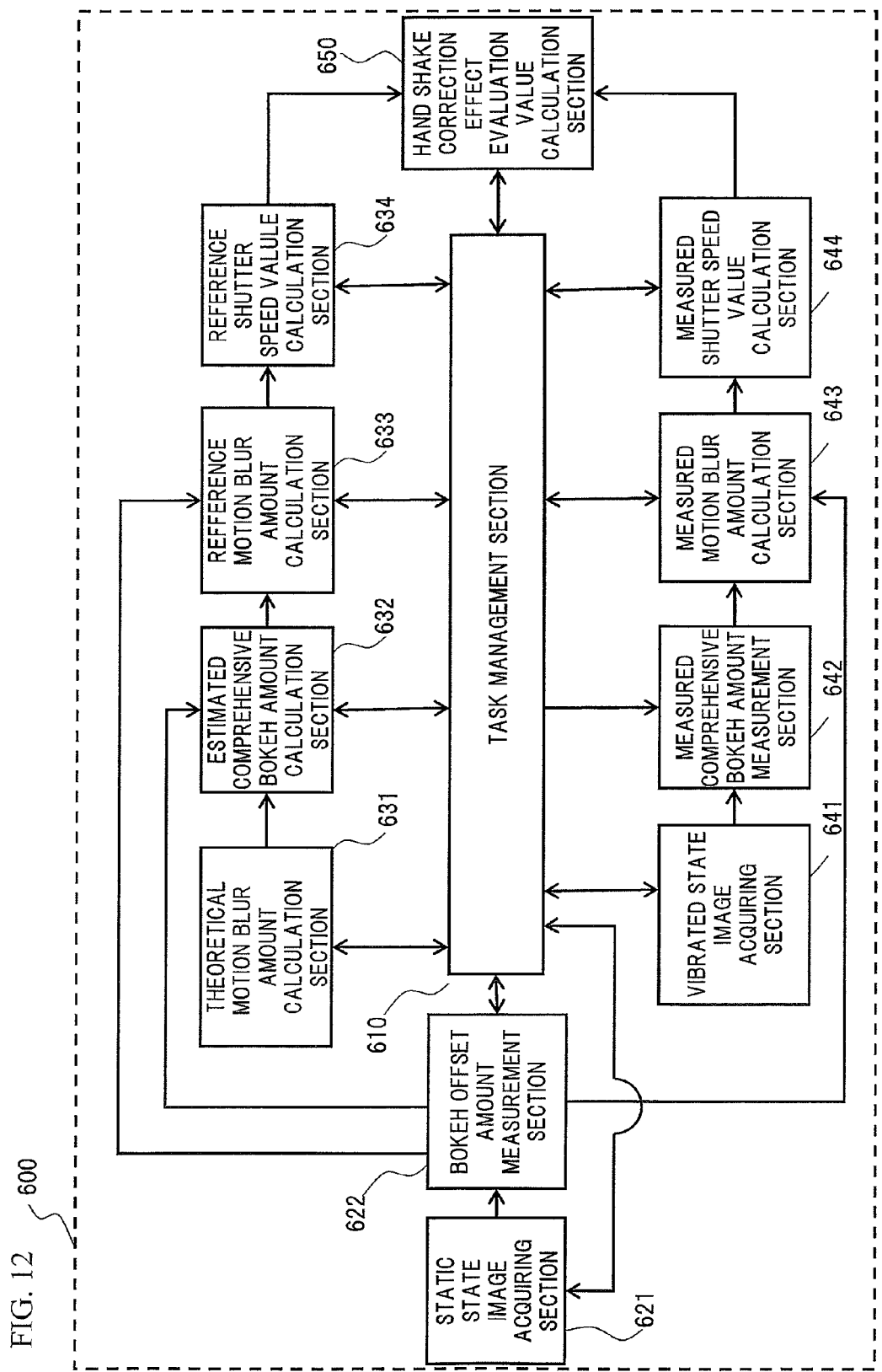
FIG. 12 is a block diagram showing the configuration of evaluation value calculation software.

FIG. 12 is a block diagram showing the configuration of the evaluation value calculation software 600. The evaluation value calculation software 600 is software for calculating an evaluation value indicating the performance of an image stabilization function of the camera 400 to be measured. A task management section 610 performs overall task management. A bokeh offset amount measurement section 622 and a measured comprehensive bokeh amount measurement section 642 are blocks incorporating the motion blur measurement software 500 or using the motion blur measurement software 500. That is, the motion blur measurement software 500 can be also regarded as subroutine software of the evaluation value calculation software 600. The processing contents of blocks from a static state image acquiring section 621 to an image stabilization performance evaluation value calculation section 650 will be described later, together with the description of an evaluation value calculation procedure (FIG. 18) which will be also described later.

[2. Evaluation Procedure]

Figure 13:
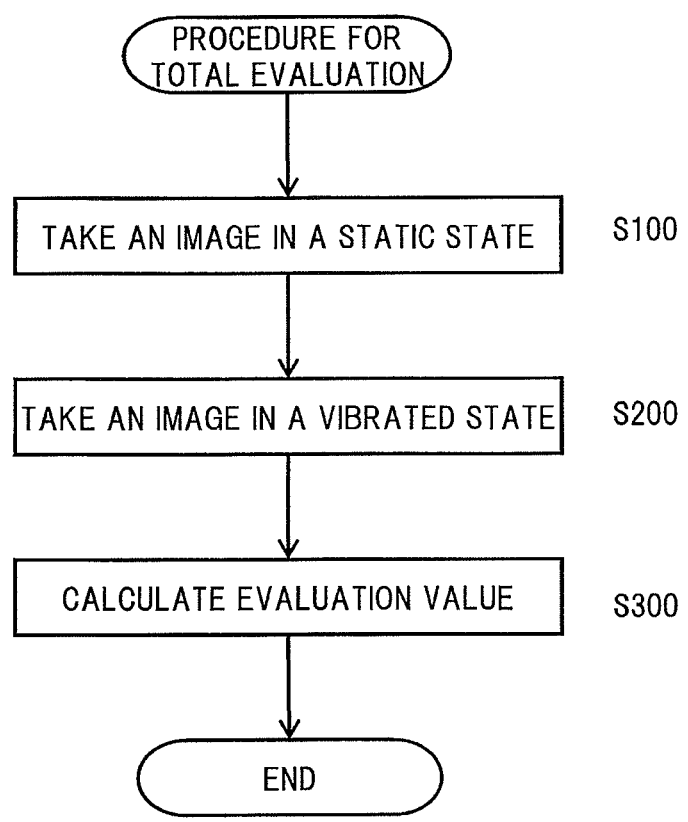
FIG. 13 is a flowchart showing the whole evaluation procedure.

An evaluation procedure for measuring the performance of the image stabilization function of the camera 400 to be measured by using the measurement system configured as described above, will be described with reference to FIG. 13.

The camera 400 to be measured is placed on the vibratory table 120, and then the camera 400 to be measured takes an image of the motion blur measurement chart 300 without shaking the vibratory table 120, thereby generating a static state image (S100). Next, the camera 400 to be measured is fixed on the vibratory table 120, and then the camera 400 to be measured takes an image of the motion blur measurement chart 300 with the vibratory table 120 being vibrated, thereby generating a vibrated state image (S200). Here, both the static state image and the vibrated state image are still images. Finally, based on the static state image and the vibrated state image that have been taken and the setting values of the camera 400 to be measured, the computer 200 measures or calculates a theoretical motion blur amount, a bokeh offset amount, an estimated comprehensive bokeh amount, a measured comprehensive bokeh amount, a reference motion blur amount, a measured motion blur amount, a reference shutter speed value, and a measured shutter speed value. Then, the computer 200 calculates an evaluation value indicating the performance of the image stabilization function of the camera 400 to be measured.

Here, the theoretical motion blur amount is a theoretical value of a motion blur amount that can be measured from an image that would be obtained with the image stabilization function being OFF (in the case of a camera not having OFF setting, assumed to be OFF) when the camera 400 to be measured is vibrated based on a vibration waveform.

In addition, the estimated comprehensive bokeh amount is a theoretical estimated value of a bokeh amount of an image that would be obtained with the image stabilization function being OFF (in the case of a camera not having OFF setting, assumed to be OFF) when the camera 400 to be measured is vibrated based on a vibration waveform. The estimated comprehensive bokeh amount is represented as the square root of the sum of square of the bokeh offset amount and square of the theoretical motion blur amount.

In addition, the reference motion blur amount is a numerical value that is a reference for calculating the image stabilization performance. The reference motion blur amount is a numerical value obtained by subtracting the bokeh offset amount from the estimated comprehensive bokeh amount.

In addition, the measured motion blur amount is a numerical value indicating the remaining camera shake that has not been corrected eventually when the image stabilization function of the camera 400 to be measured is ON. The measured motion blur amount is obtained by subtracting the bokeh offset amount from the measured comprehensive bokeh amount.

[2-1. Static State Imaging Procedure]

Figure 14:
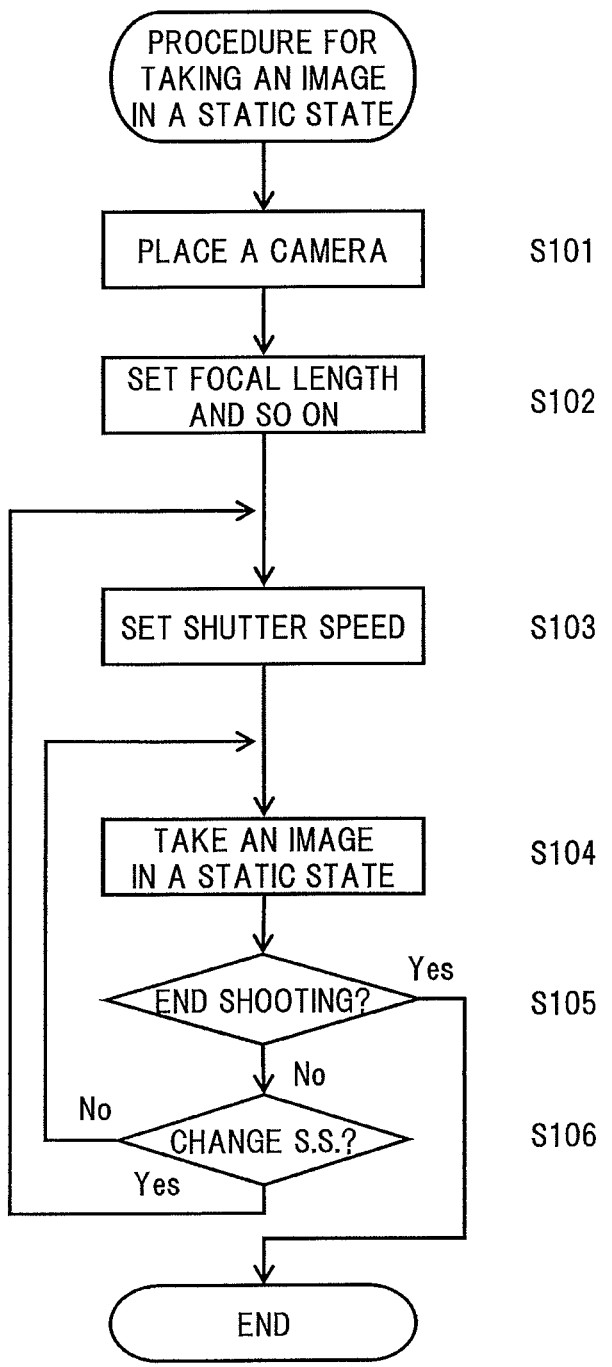
FIG. 14 is a flowchart showing an imaging procedure in a static state.

The details of a static state imaging procedure (S100) will be described with reference to a flowchart shown in FIG. 14.

First, the camera 400 to be measured is placed on the vibratory table 120 (S101). In the static state imaging, since the vibratory table 120 is not vibrated upon imaging, the camera 400 to be measured may not necessarily be fixed on the vibratory table 120. However, it is preferable that the camera 400 to be measured is fixed on the vibratory table 120 in order to ensure the stability of measurement and working continuity to vibrated state imaging described later. It is preferable that the distance (imaging distance) from the camera 400 to be measured to the motion blur measurement chart 300 is set such that the area defined by the imaging area marker 303 shown in FIG. 2 is the imaging area.

Next, the imaging conditions of the camera 400 to be measured such as a focal length and an image stabilization mode are set (S102). In the static state imaging, it is desirable that the image stabilization function is OFF. However, in some cameras, the image stabilization function cannot be turned off. In such a case, since the camera is static upon imaging, the imaging may be performed with the image stabilization function being ON under the assumption that the image stabilization function is not exerted.

Next, the shutter speed value of the camera 400 to be measured is set (S103). For example, an initial shutter speed value is set to about 1/focal length (35 mm film equivalent). In both of static state imaging (S200) and vibrated state imaging (S300), a plurality of images need to be taken for each of a plurality of shutter speeds. Accordingly, after a plurality of images are taken with the same shutter speed value, the shutter speed value is sequentially set again so as to be slowed down by up to one stop, and thus the same imaging is repeated until the shutter speed value reaches a necessary and sufficient value.

Next, the release button pressing mechanism 150 is driven to cause the camera 400 to be measured to take an image (S104). The controller 440 stores the shot image into the memory card 451, in a form of image file having a header added thereto, the header storing imaging condition information such as information indicating the focal length, the shutter speed value, and the image stabilization mode. Thus, the shot image can be stored so as to be associated with the imaging condition.

Next, the CPU 210 determines whether or not a predetermined number of images have been taken for all of the intended shutter speed values (S105), and then if such imaging has been completed (Yes in S105), ends the static state imaging procedure.

On the other hand, if such imaging has not been completed yet (No in S105), the CPU 210 determines whether or not to change the shutter speed value (S106). This determination is performed based on whether or not the predetermined number of images have been taken for the shutter speed value that is currently set. If the shutter speed value is not changed (No in S106), the process returns to step S104 to perform again the static state imaging with the shutter speed value that is currently set. If the shutter speed value is changed (Yes in S106), the process returns to step S103 to change the shutter speed value and then the static state imaging is performed again.

As a result of the above static state imaging procedure, the memory card 451 stores the predetermined number of static state images for each of the plurality of shutter speed values. Here, it is preferable that the predetermined number is about 10 or more for each shutter speed.

[2-2. Vibrated State Imaging Procedure]

Figure 15:
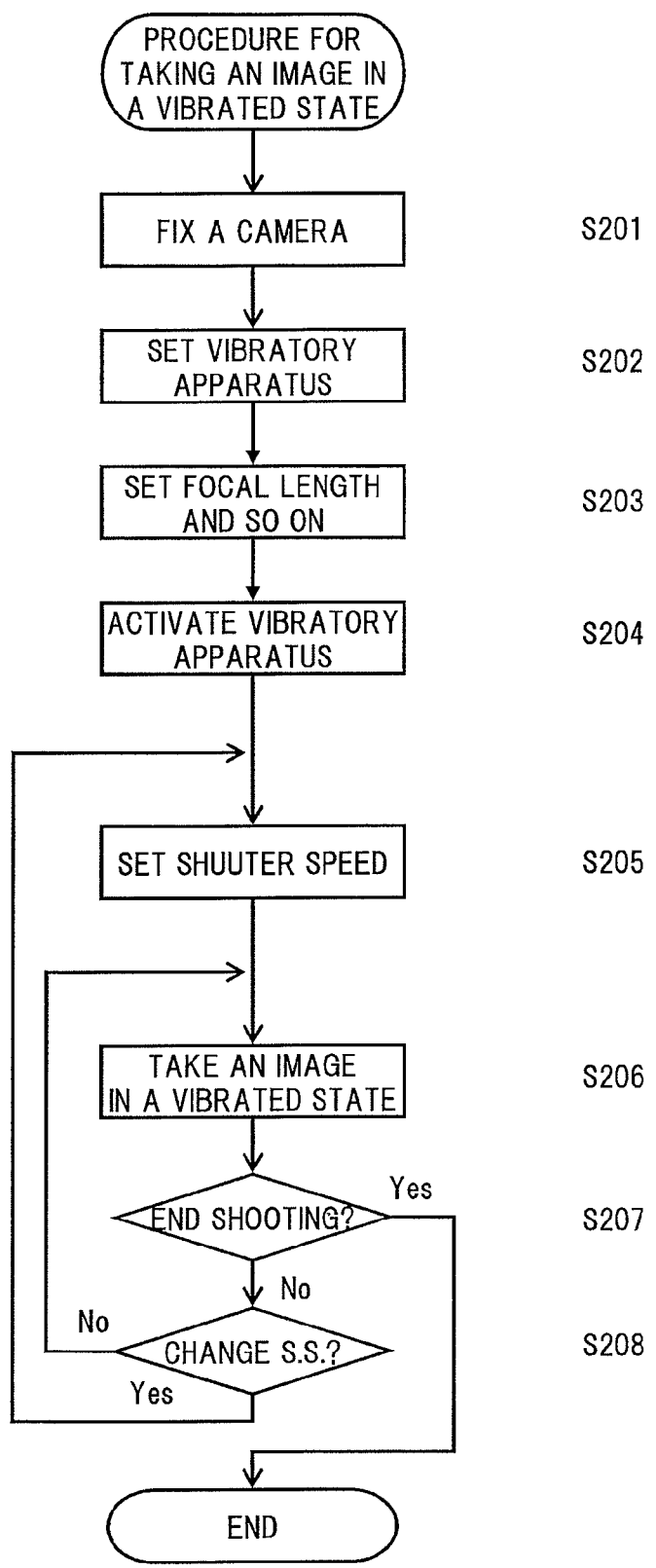
FIG. 15 is a flowchart showing an imaging procedure in a static state.

Next, the details of the vibrated state imaging procedure (S200) will be described with reference to a flowchart shown in FIG. 15.

First, the camera 400 to be measured is fixed on the vibratory table 120 (S201). If the camera 400 to be measured has been fixed on the vibratory table 120 in step S101 in the static state imaging, the static state imaging can be directly shifted to the vibrated state imaging in the same state. As in the static state imaging, it is preferable that the distance (imaging distance) from the camera 400 to be measured to the motion blur measurement chart 300 is set such that the area defined by the imaging area marker 303 shown in FIG. 2 is the imaging area.

Next, the operation condition of the vibratory table 120 is set (S202). An evaluator selects the first vibration data shown in FIG. 5 or the second vibration data shown in FIG. 6 in accordance with the mass of the camera 400 to be measured. Specifically, for example, if the mass of the camera 400 to be measured is smaller than the first mass, the first vibration data is selected from among a plurality of pieces of vibration data, and if the mass of the camera 400 to be measured is larger than the second mass, the second vibration data is selected from among the plurality of pieces of vibration data. The vibration data selected by the evaluator is given to the vibratory controller 110 from the computer 200.

Next, the imaging conditions of the camera 400 to be measured are set (S203). In the vibrated state imaging, the image stabilization function is set to ON. The focal length of the camera 400 to be measured is set at the same value as in the static state imaging.

Next, based on the vibration data selected by the evaluator, the vibratory table 120 is vibrated (S204).

Next, the shutter speed value of the camera 400 to be measured is set (S205). For example, the way of setting an initial shutter speed value and changing the shutter speed value thereafter is the same as in the static state imaging.

Next, the release button pressing mechanism 150 is driven to cause the camera 400 to be measured to take an image (S206). The way of storing the shot image into the memory card 451, and the like are the same as in the static state imaging.

Next, the CPU 210 determines whether or not a predetermined number of images have been taken for all of the intended shutter speed values (S207), and then if such imaging has been completed (Yes in S207), ends the vibrated state imaging procedure.

On the other hand, if such imaging has not been completed yet (No in S207), the CPU 210 determines whether or not to change the shutter speed value (S208). This determination is performed based on whether or not the predetermined number of images have been taken for the shutter speed value that is currently set. If the shutter speed value is not changed (No in S208), the process returns to step S206 to perform again the vibrated state imaging with the shutter speed value that is currently set. If the shutter speed value is changed (Yes in S208), the process returns to step S205 to change the shutter speed value and then the vibrated state imaging is performed again.

As a result of the above vibrated state imaging procedure, the memory card 451 stores the predetermined number of vibrated state images for each of the plurality of shutter speed values. Here, it is preferable that the predetermined number is about 200 or more for each shutter speed. The reason for taking many images is that there are variations in the motion blur amounts of the images and therefore it is necessary to perform statistic processing such as average value calculation about the motion blur amounts of the images.

[2-3-1. Camera Shake Measurement Procedure]

Figure 16:
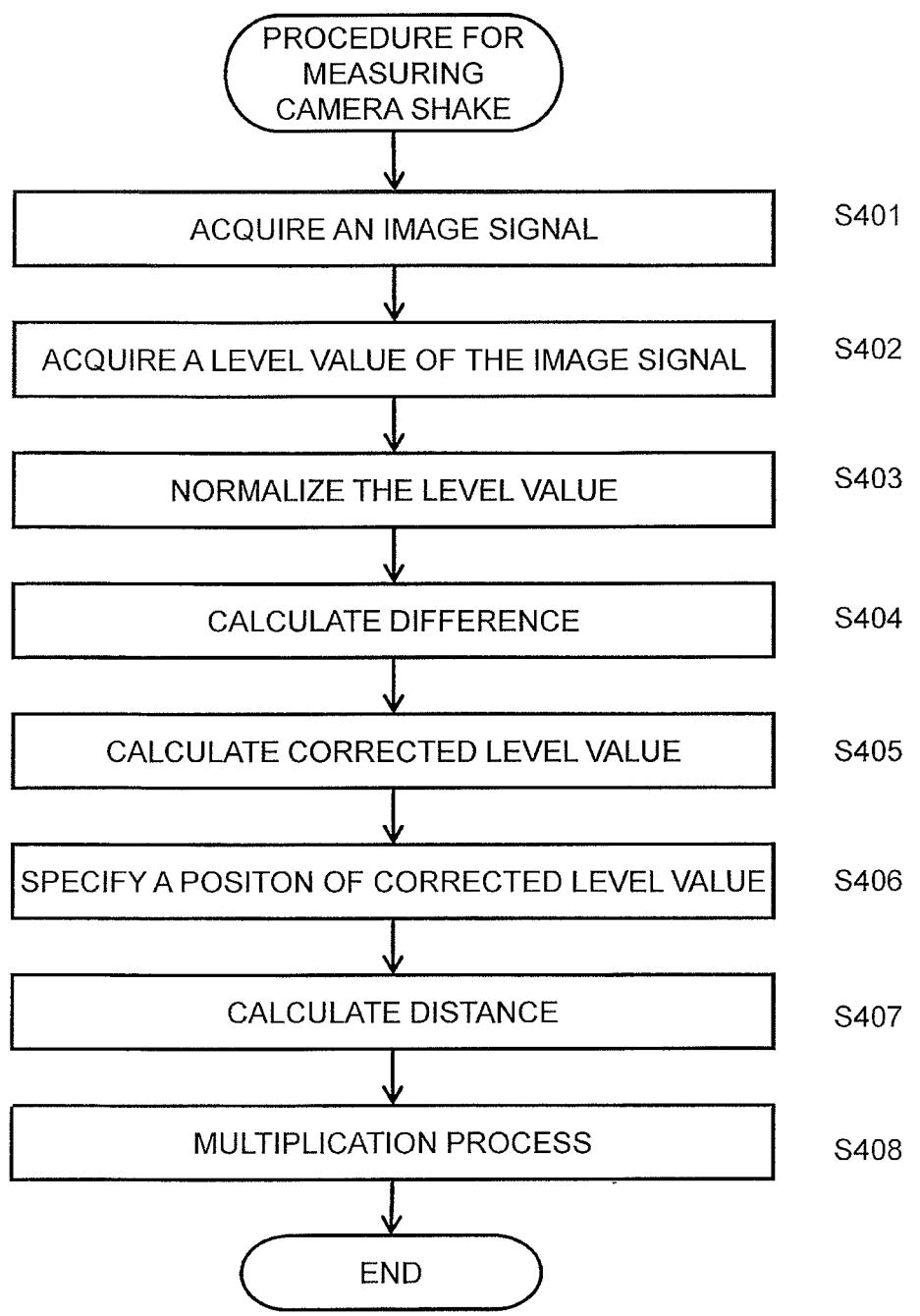
FIG. 16 is a flowchart showing a camera shake measurement procedure.

Before the description of a calculation procedure for an evaluation value indicating the performance of the image stabilization function of the camera 400 to be measured, a camera shake measurement procedure will be described with reference to FIG. 16. It is noted that the camera shake measurement procedure is executed as a part of the evaluation value calculation procedure. In addition, the camera shake measurement procedure is executed by the motion blur measurement software shown in FIG. 11, using hardware resources of the computer 200. Therefore, FIG. 11 will be referred to as necessary in the description.

First, an image signal acquiring section 520 causes the computer 200 to acquire an image signal for evaluation (S401). More specifically, the CPU 210 acquires an image signal stored in the memory card 451 by connecting the memory card 451 to the computer 200 or from the camera 400 to be measured via the first communication section 260, and then stores the image signal into the hard disk 240 or the memory 250. The image signal to be acquired may be an image signal indicating a static state image or an image signal indicating a vibrated state image.

Next, a level value acquiring section 530 causes the computer 200 to acquire, from the shot image signal, the level value of an image signal of the black area 301 and the level value of an image signal of the white area 302 shown in FIG. 2 (S402). Here, the level of an image signal refers to a predetermined physical quantity about the image signal, e.g., the brightness of the image signal.

Next, a normalizing section 540 causes the computer 200 to normalize the level value of the shot image signal with reference to a specific range (S403). For example, in the case where "10" is acquired as the level value of the image signal of the black area 301, "245" is acquired as the level value of the image signal of the white area 302, and the normalization is performed in a range of "0 to 255", the level value of the image signal of the black area 301 is set at "0" (hereinafter, for convenience, referred to as a first level value), and the level value of the image signal of the white area 302 is set at "255" (hereinafter, for convenience, referred to as a second level value).

Figure 17:
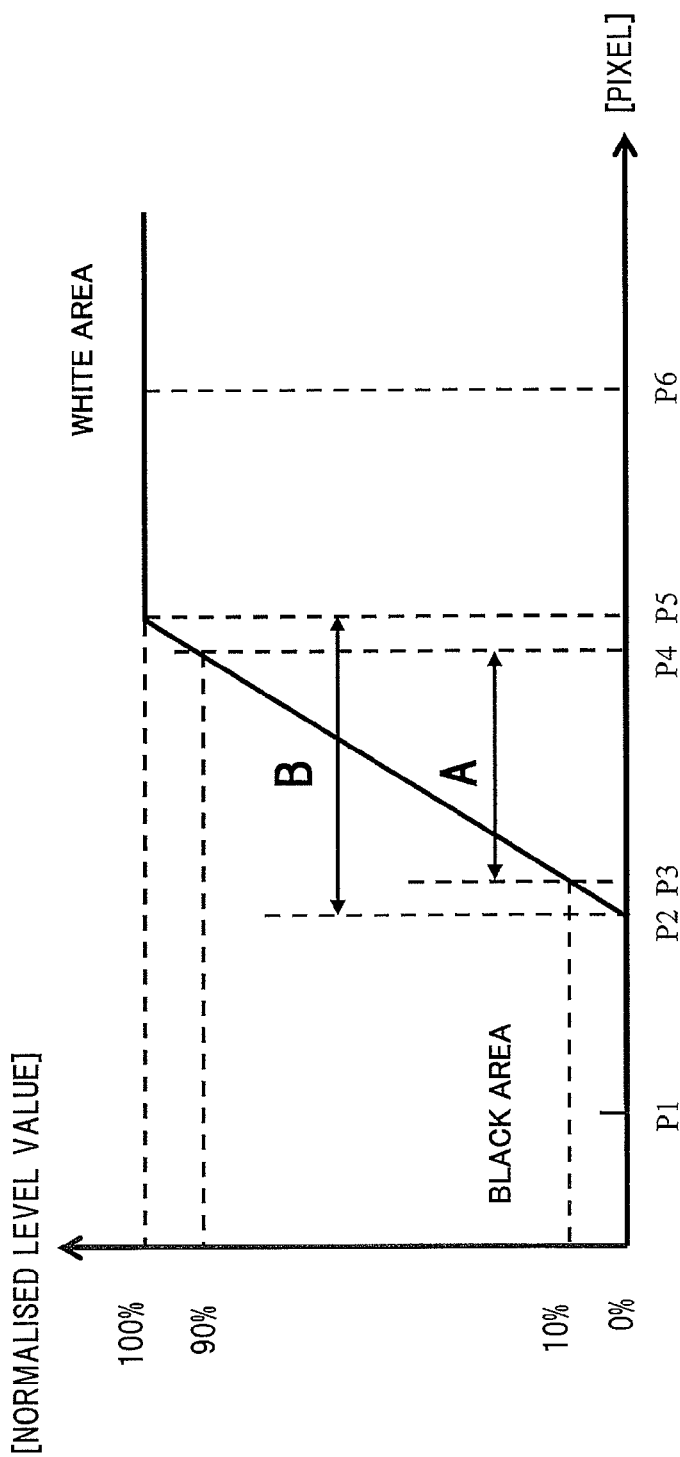
FIG. 17 is a schematic diagram for explaining a method of measuring camera shake.

FIG. 17 is a graph showing variation in the normalized level values at the boundary between the black area 301 and the white area 302. In FIG. 17, the horizontal axis indicates the number of a pixel formed on the CCD image sensor 420. The normalizing section 540 causes the computer 200 to normalize all the level values based on measured values at a pixel P1 in the black area 301 and a pixel P6 in the white area 302, for example.

Next, a difference calculation section 550 causes the computer 200 to calculate the difference between the level value of the image signal of the black area 301 and the level value of the image signal of the white area 302 (S404). In this case, these level values have been normalized in a range of "0 to 255" and therefore naturally, the difference becomes 255. This step S404 has a significance mainly when camera shake measurement is performed without normalization of the level values.

Next, a corrected level value calculation section 560 causes the computer 200 to calculate a first corrected level value by adding X % of the calculated difference to the first level value, and to calculate a second corrected level value by subtracting Y % of the calculated difference from the second level value. Specifically, if X % is 10% and Y % is 10%, the first corrected level value is "25.5" and the second corrected level value "229.5".

Next, a corrected level position specifying section 570 causes the computer 200 to specify a pixel position where the level value is the first corrected level value, as a first corrected level position, and a pixel position where the level value is the second corrected level value, as a second corrected level position, at the boundary between the black area 301 and the white area 302. With reference to FIG. 17, a pixel P3 is the first corrected level position and a pixel P4 is the second corrected level position.

Next, a distance calculation section 580 causes the computer 200 to calculate the distance between the first corrected level position and the second corrected level position (S407). With reference to FIG. 17, a distance A is the calculated distance. The distance A is a distance converted in 35 mm film equivalent from the number of pixels between the pixel P3 and the pixel P4.

Finally, a multiplication processing section 590 multiplies the distance calculated in step S407 by 100/(100−X−Y) (S408). With reference to FIG. 17, since X % and Y % are both 10%, the distance A is multiplied by 10/8. The value thus calculated corresponds to an estimated value of a distance B. The distance B is a distance converted in 35 mm film equivalent from the number of pixels between the pixel P2 and the pixel P5.

The reason for actually measuring the distance in a specific level range and then estimating a bokeh amount at the boundary between the black area 301 and the white area 302 based on the measured distance, is to exclude the influence of noise at the boundary (the vicinity of the pixel P2 in FIG. 17) between the black area 301 and the bokeh area or the boundary (the vicinity of the pixel P5 in FIG. 17) between the white area 302 and the bokeh area. This is because the influence of noise is particularly likely to appear in the vicinity of such boundaries.

[2-3-2. Evaluation Value Calculation Procedure]

Figure 18:
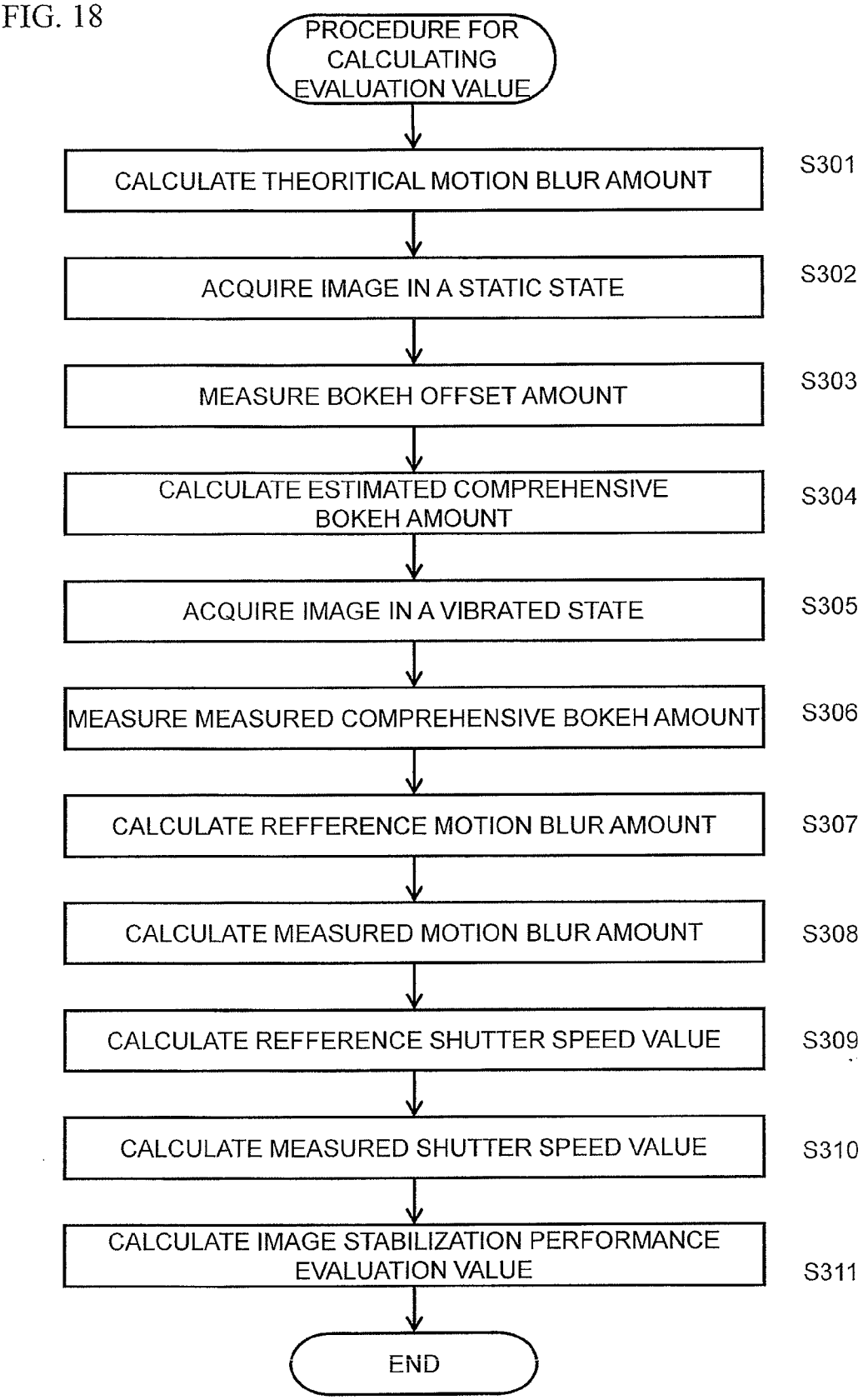
FIG. 18 is a flowchart showing an evaluation value calculation procedure.
Figure 19:
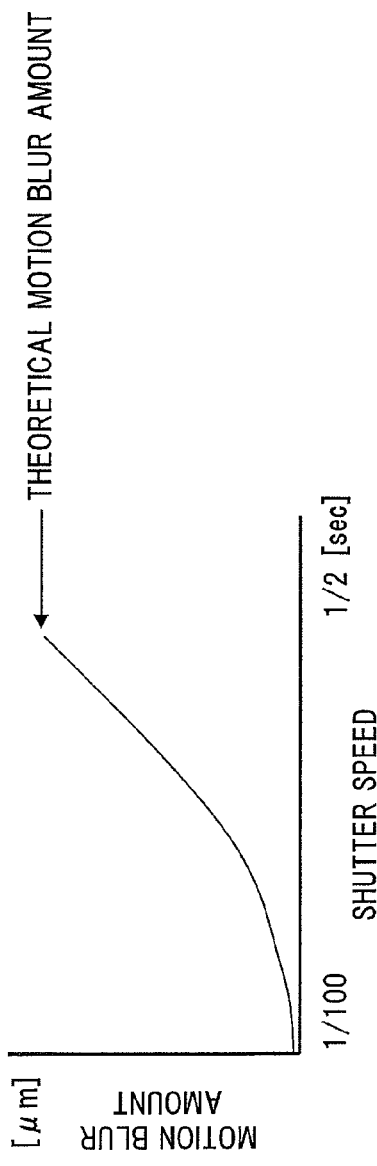
FIG. 19 is a graph showing the trajectory of a theoretical motion blur amount.

With reference to FIG. 18, the calculation procedure for an evaluation value indicating the performance of the image stabilization function of the camera 400 to be measured, will be described. In the following description, FIGS. 19 to 22 will be referred to as necessary. These figures are characteristic graphs of a camera shake, in which the horizontal axis indicates a shutter speed value and the vertical axis indicates a camera shake. In addition, evaluation value calculation procedure is realized by the evaluation value calculation software shown in FIG. 12, using the hardware resources of the computer 200. Therefore, the description will be performed by referring to FIG. 12 as necessary.

First, a theoretical motion blur amount calculation section 631 causes the computer 200 to acquire the focal length set on the camera 400 to be measured, calculate a focal length in 35 mm film equivalent from the acquired focal length, and then calculate a theoretical motion blur amount by using the focal length in 35 mm film equivalent (S301). Regarding the acquisition of the focal length, a value inputted via the keyboard 220 by an evaluator may be accepted, a setting value may be received from the camera 400 to be measured, or the value may be read from the header of an image file. The theoretical motion blur amount is calculated based on the following expression.

Theoretical motion blur amount [μm]=Focal Length in 35 mm Film Equivalent [mm]×tan θ×1000

Here, θ is referred to as an average vibration angle which is the average value for each shutter speed, of camera shake angles that would occur when the camera is vibrated based on the vibration data. Since two kinds of vibration data are prepared as shown in FIGS. 5 and 6, at least two kinds of average vibration angles θ are prepared, too. Since the average vibration angle θ increases as the shutter speed value increases, the theoretical motion blur amount draws a trajectory schematically shown in FIG. 19.

Next, a static state image acquiring section 621 causes the computer 200 to acquire a plurality of static state images obtained by imaging the motion blur measurement chart 300 a plurality of times for each of the plurality of shutter speeds (S302). More specifically, the CPU 210 acquires the static state images stored in the memory card 451 by connecting the memory card 451 to the computer 200 or from the camera 400 to be measured via the first communication section 260, and then stores the static state images into the hard disk 240 or the memory 250.

Next, a bokeh offset amount measurement section 622 causes the computer 200 to measure, as a bokeh offset amount, a bokeh amount at the boundary between different color areas (in embodiment 1, between the black area 301 and the white area 302) in the acquired static state images, for each of the plurality of shutter speeds (S303). The measurement of the bokeh offset amount is performed using the motion blur measurement software 500 shown in FIG. 11, as described above.

Figure 20:
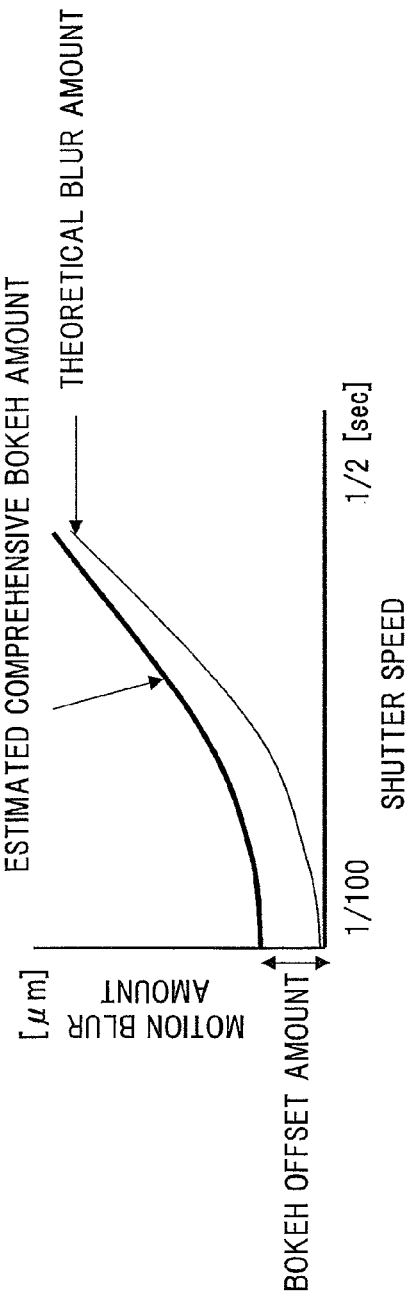
FIG. 20 is a graph showing the relationship among a theoretical motion blur amount, a bokeh offset amount, and an estimated comprehensive bokeh amount.
Figure 21:
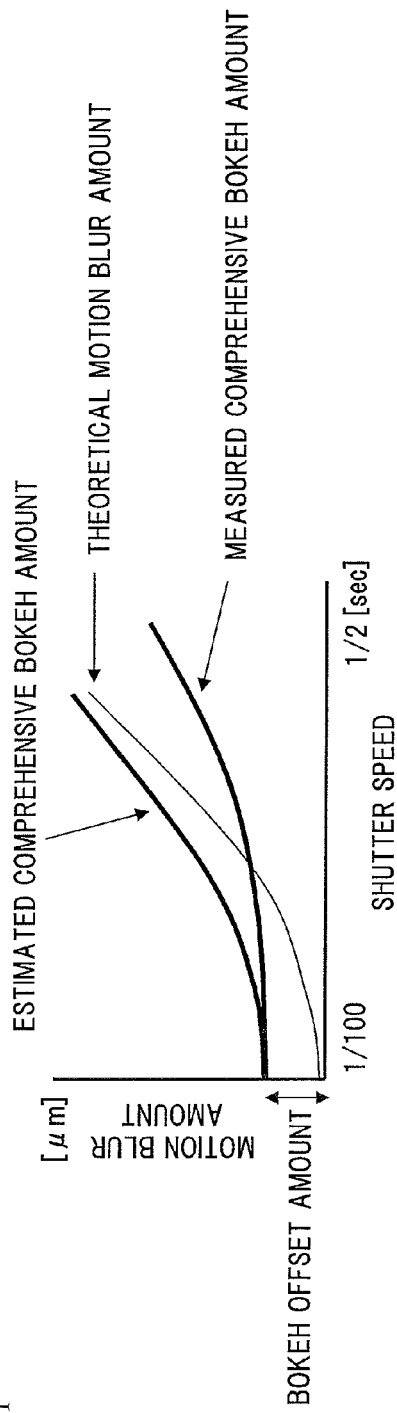
FIG. 21 is a graph showing the trajectories of an estimated comprehensive bokeh amount and a measured comprehensive bokeh amount.

Next, an estimated comprehensive bokeh amount calculation section 632 causes the computer 200 to calculate an estimated comprehensive bokeh amount for each of the plurality of shutter speeds by superimposing the measured bokeh offset amount onto the calculated theoretical motion blur amount for each of the plurality of shutter speeds (S304). The estimated comprehensive bokeh amount is represented as the square root of the sum of square of the theoretical motion blur amount and square of the bokeh offset amount, for example. As a result, the estimated comprehensive bokeh amount draws a trajectory schematically shown in FIG. 20. By superimposing the bokeh offset amount onto the theoretical motion blur amount, as shown in FIG. 20, as well as increase in the value of the estimated comprehensive bokeh amount, the change rate of the slope of the tangent of the curve changes. This is due to the influence of the bokeh offset amount, that is, this means that the influence of a bokeh of an image intrinsic to the camera 400 to be measured is incorporated into the present evaluation value calculation procedure. More simply, in the case of a camera intrinsically having a small bokeh amount, the curve of the estimated comprehensive bokeh amount is close to the curve of the theoretical motion blur amount, and on the other hand, in the case of a camera intrinsically having a large bokeh amount, the curve of the estimated comprehensive bokeh amount is far from the curve of the theoretical motion blur amount, and also, the change rate of the slope of the tangent thereof is small.

Next, a vibrated state image acquiring section 641 causes the computer 200 to acquire a plurality of vibrated state images obtained by imaging the motion blur measurement chart 300 a plurality of times for each of the plurality of shutter speeds (S305). More specifically, the CPU 210 acquires the vibrated state images stored in the memory card 451 by connecting the memory card 451 to the computer 200 or from the camera 400 to be measured via the first communication section 260, and stores the vibrated state images into the hard disk 240 or the memory 250.

Next, a measured comprehensive bokeh amount measurement section 642 causes the computer 200 to measure, as a measured comprehensive bokeh amount, a bokeh amount at the boundary between different color areas in the acquired vibrated state images, for each of the plurality of shutter speeds (S306). The measurement of the measured comprehensive bokeh amount is performed using the motion blur measurement software 500 shown in FIG. 11, as described above. The measured comprehensive bokeh amount is measured as a bokeh amount in 35 mm film equivalent. As a result, the measured comprehensive bokeh amount draws a trajectory schematically shown in FIG. 21.

Next, a reference motion blur amount calculation section 633 causes the computer 200 to calculate a reference motion blur amount for each of the plurality of shutter speed values by subtracting the measured bokeh offset amount from the calculated estimated comprehensive bokeh amount (S307).

Next, a measured motion blur amount calculation section 643 causes the computer 200 to calculate a measured motion blur amount for each of the plurality of shutter speed values by subtracting the measured bokeh offset amount from the measured comprehensive bokeh amount (S308). At this time, if the measured motion blur amount becomes a negative value, the measured motion blur amount is made to be zero. As a result, the reference motion blur amount and the measured motion blur amount draw trajectories schematically shown in FIG. 22.

Figure 22:
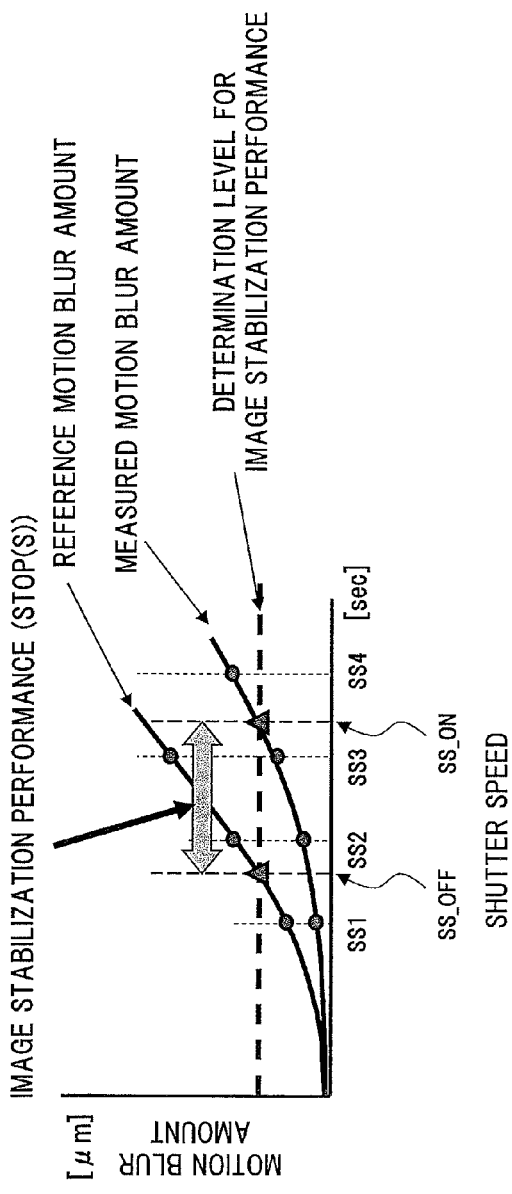
FIG. 22 is a graph showing a calculation method for an evaluation value of an image stabilization performance.

Next, a reference shutter speed value calculation section 634 causes the computer 200 to calculate a shutter speed value that causes a specific motion blur amount, as a reference shutter speed value, by using the plurality of reference motion blur amounts that have been calculated (S309). The specific motion blur amount is, for convenience, referred to as a determination level for image stabilization function. In FIG. 22, a shutter speed value indicated by "SS_OFF" is the reference shutter speed value.

Next, a measured shutter speed value calculation section 644 causes the computer 200 to calculate a shutter speed value that causes the specific motion blur amount, as a measured shutter speed value, by using the plurality of measured motion blur amounts that have been calculated (S310). In FIG. 22, a shutter speed value indicated by "SS_ON" is the measured shutter speed value.

Finally, an image stabilization performance evaluation value calculation section 650 causes the computer 200 to calculate an evaluation value indicating the performance of the image stabilization function of the camera 400 to be measured for the focal length at which the imaging has been performed, by using the reference shutter speed value and the measured shutter speed value (S311). In FIG. 22, a stop number of shutter speed between "SS_OFF" and "SS_ON" corresponds to the above evaluation value.

Thus, the evaluation value indicating the performance of the image stabilization function can be calculated. In the procedure shown in embodiment 1, the influence of the bokeh offset amount is reflected in calculation of the estimated comprehensive bokeh amount and the reference motion blur amount. This is an important matter for enhancing the accuracy of the evaluation value. Then, hereinafter, the influence of the bokeh offset amount will be described in detail with reference to FIGS. 23 to 26.

Figure 23:
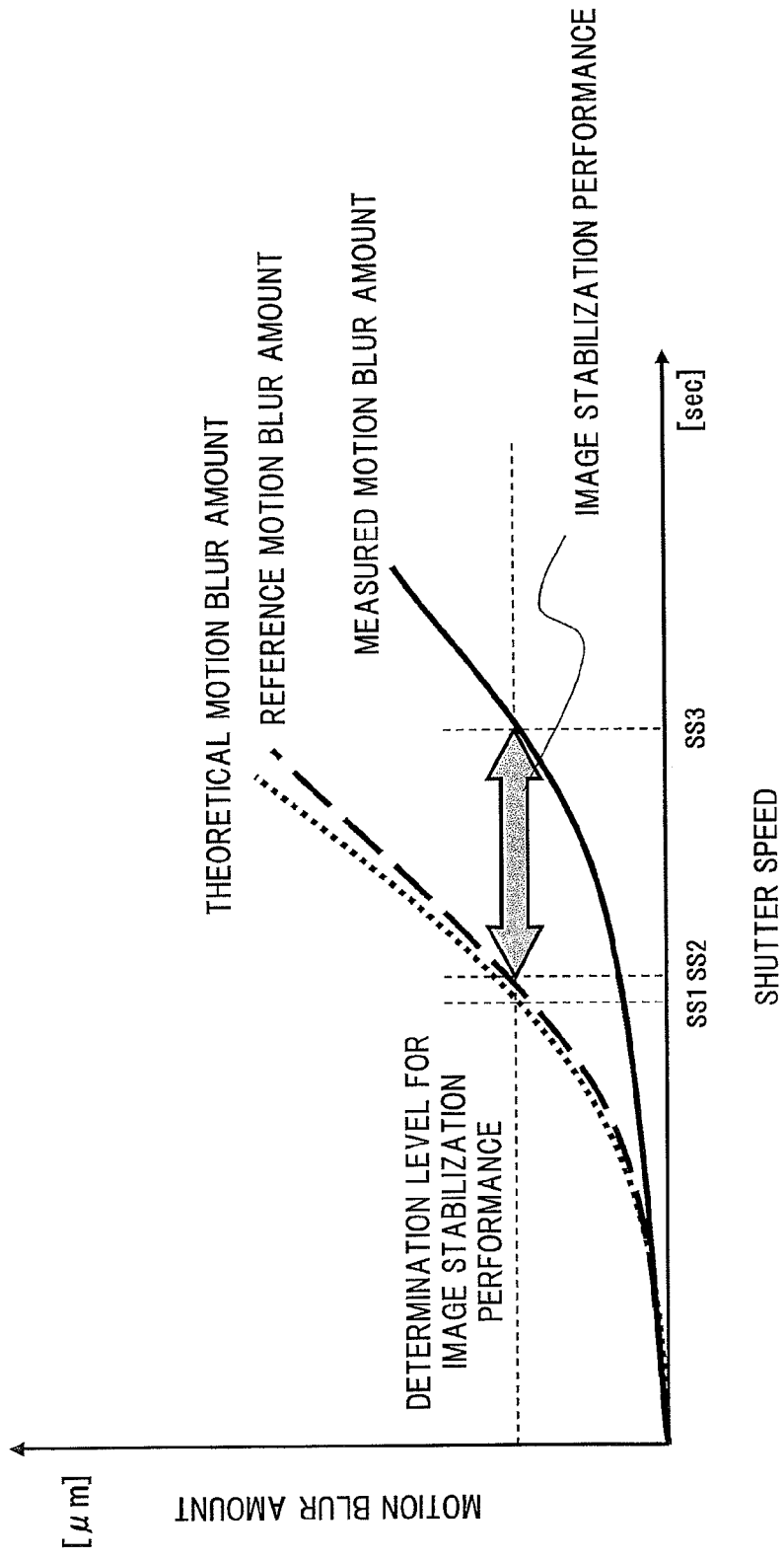
FIG. 23 is a graph showing the trajectory of a bokeh amount for explaining the influence of a bokeh offset amount.
Figure 24:
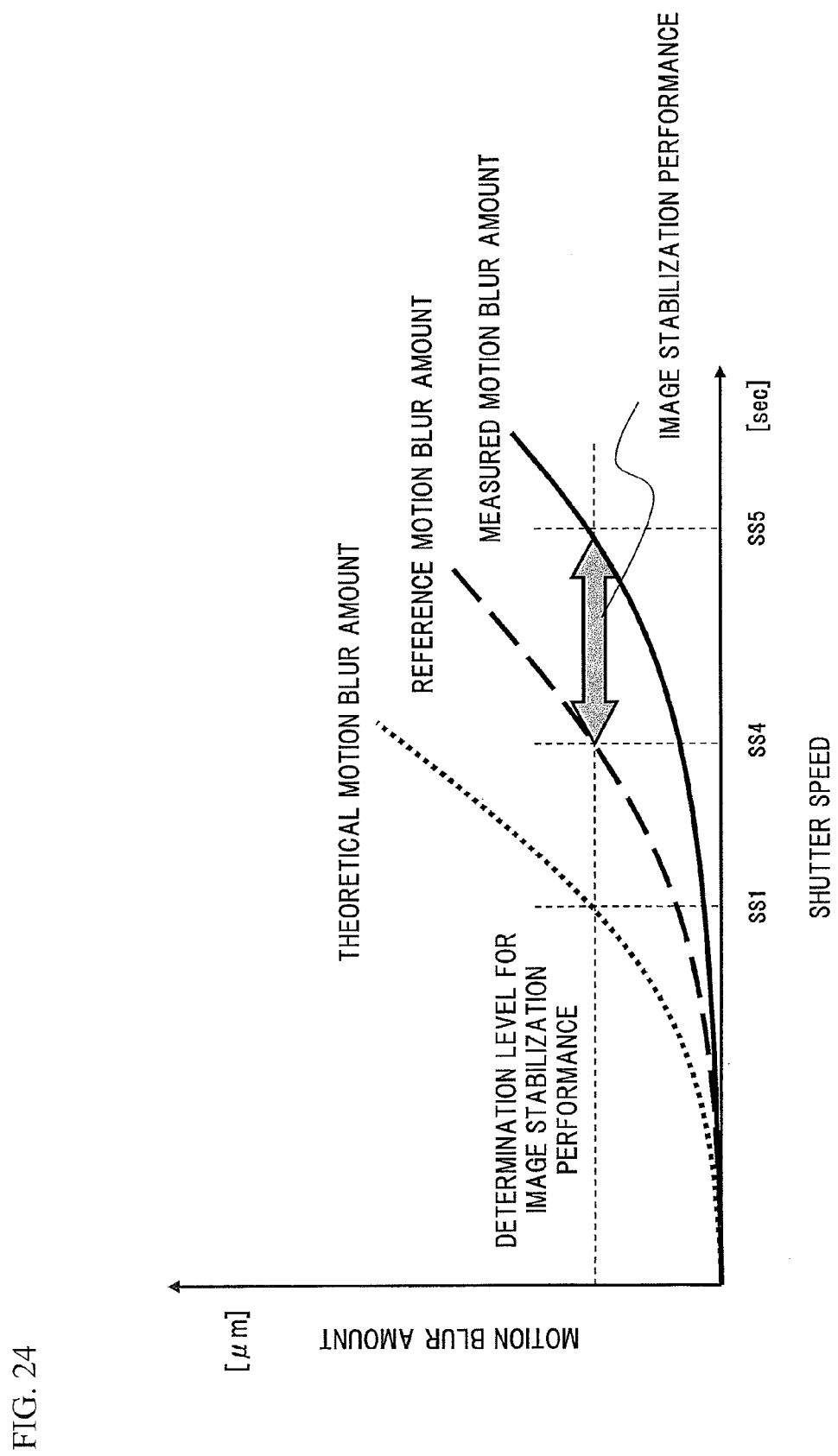
FIG. 24 is a graph showing the trajectory of a bokeh amount for explaining the influence of a bokeh offset amount.

In the following description, for facilitating the description, a camera A to be measured and a camera B to be measured having the same mass, the same focal length, and the same performance of the image stabilization function will be assumed. The bokeh offset amount of the camera A to be measured is smaller than that of the camera B to be measured. That is, the bokeh amount of an image intrinsic to the camera A to be measured is small, and the bokeh amount of an image intrinsic to the camera B to be measured is large. FIGS. 23 and 24 are characteristic diagrams of a motion blur amount showing the trajectories of the theoretical motion blur amount, the reference motion blur amount, and the measured motion blur amount. FIG. 23 is a characteristic diagram for the camera A to be measured, and FIG. 24 is a characteristic diagram for the camera B to be measured.

As shown in FIG. 23, since the bokeh offset amount of the camera A to be measured is small, the trajectory of the reference motion blur amount almost coincides with the trajectory of the theoretical motion blur amount. Therefore, even if the bokeh offset amount is not taken into consideration, that is, the theoretical motion blur amount is used as the trajectory of a motion blur amount obtained when the image stabilization function is OFF, the image stabilization performance corresponds to the stop number between the shutter speed value SS1 and the shutter speed value SS3. The image stabilization performance in the case of taking the bokeh offset amount into consideration corresponds to the stop number between the shutter speed value SS2 and the shutter speed value SS3. Therefore, the difference between both cases is slight as shown by the stop number between the shutter speed value SS1 and the shutter speed value SS2. That is, in the case of the camera A to be measured having a small bokeh offset amount, even if an evaluation value indicating the image stabilization performance is calculated without consideration of the bokeh offset amount, a significant problem does not occur so much.

On the other hand, in the case of the camera B to be measured having a large bokeh offset amount, if an evaluation value indicating the image stabilization performance is calculated without consideration of the bokeh offset amount, the calculated evaluation value deviates from the actual value, thus causing a significant problem. Hereinafter, this point will be described in detail.

First, since the camera A to be measured and the camera B to be measured have the same mass, the average vibration angles given in advance are the same. In addition, since their focal lengths are also the same, the theoretical motion blur amount of the camera A to be measured and the theoretical motion blur amount the camera B to be measured are the same. Therefore, as shown in FIG. 24, a shutter speed value at the intersection of the trajectory of the theoretical motion blur amount and the determination level for image stabilization performance becomes the shutter speed value SS1, in both cameras.

Figure 25:
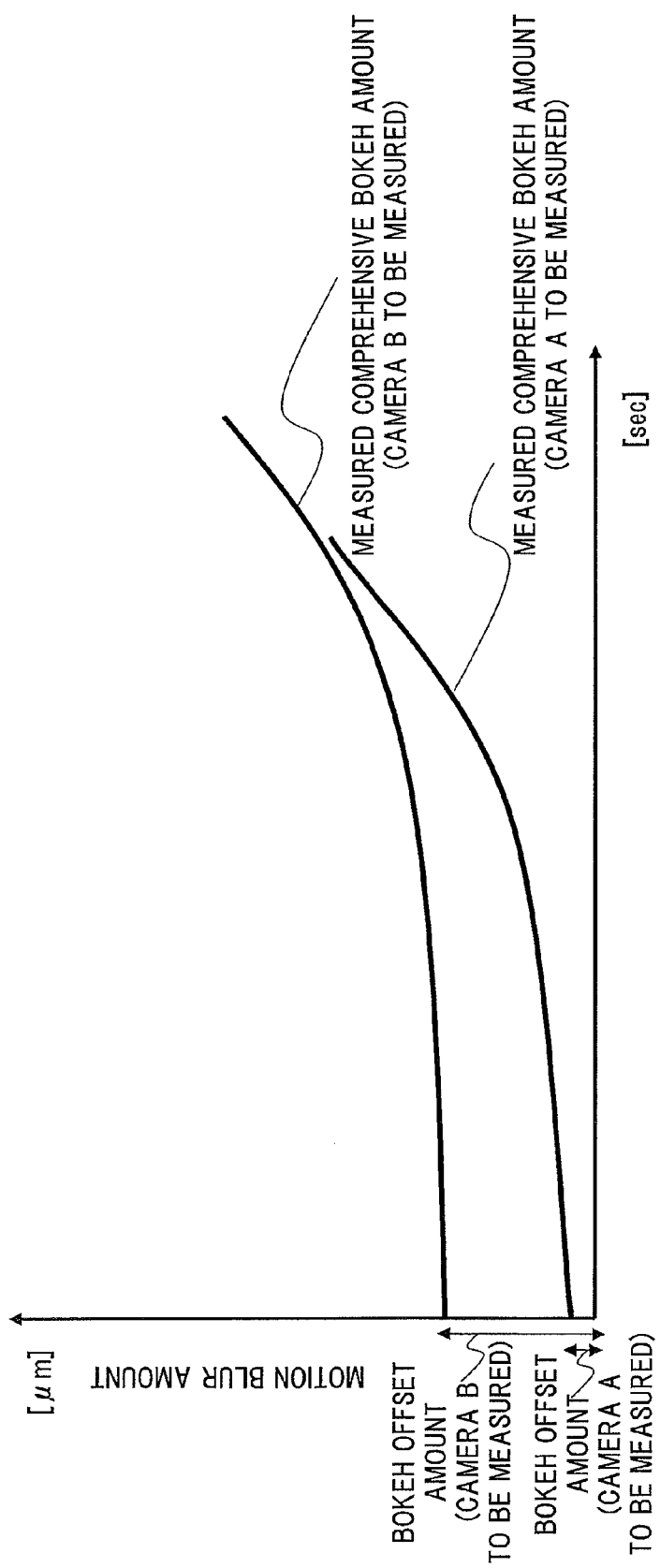
FIG. 25 is a graph showing the trajectory of a bokeh amount for explaining the influence of a bokeh offset amount.
Figure 26:
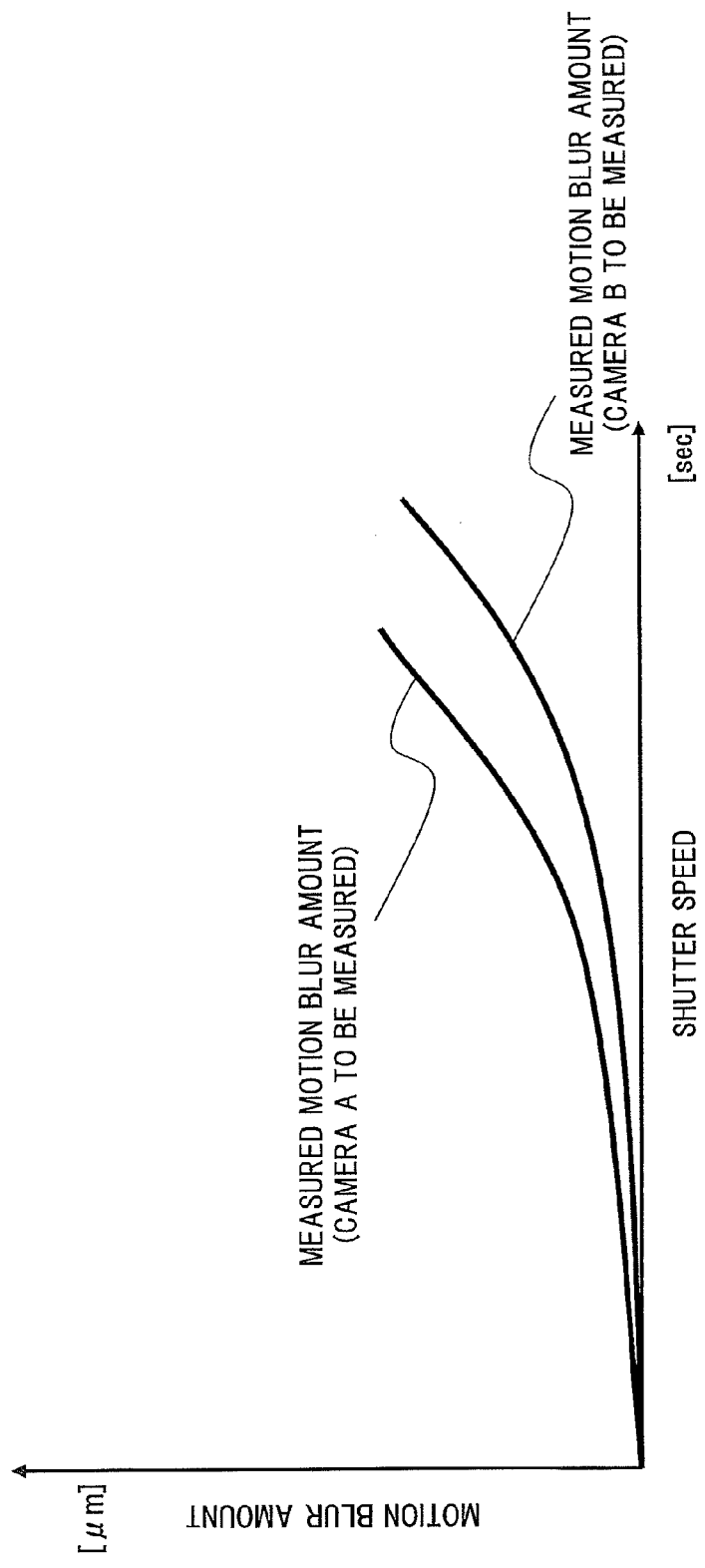
FIG. 26 is a graph showing the trajectory of a bokeh amount for explaining the influence of a bokeh offset amount.

Next, since the bokeh offset amount of the camera B to be measured is large, as shown in FIG. 25, the trajectory of the measured comprehensive bokeh amount of the camera B to be measured is more gradual than the trajectory of the measured comprehensive bokeh amount of the camera A to be measured. The reason is as follows. That is, in the case of a camera having a large bokeh offset amount, in a region where the shutter speed value is small, the bokeh offset amount is more dominant to the measured comprehensive bokeh amount than a bokeh due to a camera shake, and meanwhile, in a region where the shutter speed value is large, the influence of a bokeh due to a camera shake becomes large, so that the difference in the measured comprehensive bokeh amount between the camera A to be measured and the camera B to be measured becomes small. Accordingly, by subtracting the bokeh offset amount from the measured comprehensive bokeh amount shown in FIG. 25, the measured motion blur amounts shown in FIG. 26 are obtained.

Here, if an evaluation value indicating the image stabilization performance is calculated from the stop number between the shutter speed value SS1 and the shutter speed value SS5 with reference to the theoretical motion blur amount without consideration of the bokeh offset amount, the camera B to be measured intrinsically having a large bokeh amount of an image is evaluated to have a higher performance of the image stabilization function even though the camera A to be measured and the camera B to be measured actually have the same performance of the image stabilization function. This is obviously inappropriate as an evaluation method.

Accordingly, in the present application, the bokeh offset amount is taken into consideration upon calculation of an evaluation value indicating the performance of the image stabilization function. Specifically, upon calculation of the reference motion blur amount, the bokeh offset amount is superimposed onto the theoretical motion blur amount, thereby calculating the estimated comprehensive bokeh amount. Then, the bokeh offset amount is subtracted from the estimated comprehensive bokeh amount, thereby obtaining the reference motion blur amount. Thus, in the case of a camera having a large bokeh offset amount, the trajectory of the reference motion blur amount becomes away from the trajectory of the theoretical motion blur amount. That is, the shutter speed value (SS4) at the intersection of the trajectory of the reference motion blur amount and the determination level for image stabilization performance shown in FIG. 24 is larger than such a shutter speed value (SS2) in the case of the camera A to be measured shown in FIG. 23. Therefore, the stop number between the shutter speed value SS1 and the shutter speed value SS4 becomes larger than the stop number between the shutter speed value SS1 and the shutter speed value SS2. As a result, in the camera B to be measured, the evaluation value indicating the image stabilization performance becomes small which is obtained based on the stop number between the shutter speed value (SS4) at the intersection of the reference motion blur amount and the determination level for image stabilization function, and the shutter speed value (SS5) at the intersection of the measured motion blur amount and the determination level for image stabilization performance. Thus, the evaluation value becomes close to the evaluation value (the stop number between the shutter speed value SS2 and the shutter speed value SS3 shown in FIG. 23) obtained for the camera A to be measured, whereby a more appropriate evaluation value can be obtained.

To summarize, as is obvious from FIGS. 23 to 26, the larger the bokeh amount intrinsic to a camera to be measured is, the more gradual the trajectory of the measured motion blur amount is. Therefore, if an evaluation value indicating the performance of the image stabilization function is calculated based on the reference motion blur amount calculated without consideration of the bokeh offset amount, the result is that the larger the bokeh offset amount of a camera to be measured is, the higher the performance of the image stabilization function is. In order to avoid such a result, as in embodiment 1, the bokeh offset amount has been taken into consideration upon calculation of an evaluation value indicating the performance of the image stabilization function.

(Embodiment 2)

In embodiment 1, the motion blur measurement software has been used for evaluation of the performance of the image stabilization function. Instead, for example, the motion blur measurement software may be incorporated into a camera.

By thus incorporating the motion blur measurement software, a bokeh amount of a shot image can be measured more accurately. This software can be utilized for a function of alerting a user that a shot image is blurred after the imaging or a function of correcting the bokeh of the shot image through image processing.

(Embodiment 3)

In embodiment 1, an evaluator has selected vibration data in accordance with the mass of the camera 400 to be measured. However, the computer 200 may select vibration data. In this case, the computer 200 functions as: a selection section for selecting one of a plurality of pieces of vibration data in accordance with the mass of the camera 400 to be measured; a vibration control section for shaking the vibratory table 120 of the vibratory apparatus 100 on which the camera 400 to be measured is fixed, in accordance with the selected vibration data; an acquiring section for acquiring an evaluation image taken and generated by the camera 400 to be measured while the vibratory table 120 is being vibrated; and a measurement section for measuring a motion blur amount of an image based on the acquired evaluation image. Thus, an evaluator's operation to select vibration data can be omitted.

Alternatively, a computer program including: a selection section for causing the computer 200 to select one of a plurality of pieces of vibration data in accordance with the mass of the camera 400 to be measured; a vibration control section for controlling the computer 200 so as to vibrate the vibratory table 120 of the vibratory apparatus 100 on which the camera 400 to be measured is fixed, in accordance with the selected vibration data; an acquiring section for causing the computer 200 to acquire an evaluation image taken and generated by the camera 400 to be measured while the vibratory table 120 is being vibrated; and a measurement section for causing the computer 200 to measure a motion blur amount of an image based on the acquired evaluation image, may be installed into the computer 200, whereby the measurement of motion blur amount of a camera may be realized. Such a computer program can be stored in a storage medium such as a memory card, an optical disc, a hard disk, or a magnetic tape. Thus, by realizing the measurement method for a motion blur amount of a camera as a computer program, it becomes possible to measure a motion blur amount of a camera, using a total-purpose computer.

In embodiment 3, the computer 200 acquires the mass of the camera 400 to be measured by any means. For example, an evaluator may input mass data of the camera 400 to be measured via the keyboard 220. Thus, an evaluator's operation to select vibration data can be omitted. Alternatively, a weight scale may be provided for the vibratory apparatus 100, and then mass data of the camera 400 to be measured may be acquired from the vibratory apparatus 100. Thus, the trouble for the evaluator to select vibration data or input the mass data can be saved.

(Other Embodiments)

As embodiments of the present disclosure, the above embodiments 1 to 3 have been described. However, the present disclosure is not limited to embodiments 1 to 3, but may be used with modifications as appropriate. Then, other embodiments of the present disclosure will be collectively described in this section below.

In embodiment 1, the estimated comprehensive bokeh amount is calculated based on the theoretical motion blur amount and the bokeh offset amount, the bokeh offset amount is subtracted from each of the estimated comprehensive bokeh amount and the measured comprehensive bokeh amount, and then shutter speed values at the determination level for image stabilization performance are read, whereby an evaluation value of an image stabilization performance is calculated. However, the present disclosure is not limited thereto. For example, after the estimated comprehensive bokeh amount is calculated based on the theoretical motion blur amount and the bokeh offset amount, shutter speed values at a level obtained by adding the bokeh offset amount to the determination level for image stabilization performance may be read from the estimated comprehensive bokeh amount and the measured comprehensive bokeh amount, whereby an evaluation value of an image stabilization performance may be calculated. In essence, an evaluation value indicating the performance of an image stabilization function of a camera may be calculated based on the theoretical motion blur amount, the bokeh offset amount, and the measured comprehensive bokeh amount.

In embodiment 1, the functions of the motion blur measurement software 500 and the evaluation value calculation software 600 have been realized by using hardware resources of the computer 200, but the present disclosure is not limited thereto. For example, the computer 200 may incorporate therein hardware such as wired logic for realizing the functions of the motion blur measurement software 500 and the evaluation value calculation software 600, thereby realizing the measurement of the motion blur amount and the calculation of the evaluation value. Alternatively, the functions of the motion blur measurement software 500 and the evaluation value calculation software 600 may be realized by using hardware resources of the vibratory apparatus 100. In essence, a measurement device capable of realizing the functions of the motion blur measurement software 500 and the evaluation value calculation software 600 may be provided in the measurement system shown in FIG. 1.

In embodiment 1, the evaluation system has been controlled by the computer 200, but the present disclosure is not limited thereto. For example, a camera to be measured may have such a control function. Specifically, the functions of the motion blur measurement software 500 and the evaluation value calculation software 600 may be provided with a camera to be measured, so that the camera to be measured by itself can calculate an evaluation value indicating the performance of an image stabilization function based on a shot image. In addition, a camera to be measured may have vibration data and the like stored therein, so that the camera to be measured can control the vibratory apparatus 100.

In embodiment 1, in the camera shake measurement procedure (FIG. 16), the level value has been normalized (S403) to conduct the measurement flow of the motion blur amount, but the present disclosure is not limited thereto. For example, the measurement flow of the motion blur amount may be conducted without normalizing the level value.

In embodiment 1, the shutter speed value of the camera 400 to be measured has been set based on an instruction from the computer 200, but the present disclosure is not limited thereto. For example, the shutter speed value may be manually set by an evaluator before imaging of an evaluation image. Alternatively, in the case where the shutter speed value cannot be manually set, the shutter speed value automatically set by the camera 400 to be measured may be substantially set by adjustment of the amount of light radiated to the motion blur measurement chart 300.

The measurement method of the present disclosure can be used for evaluating the performance of an image stabilization function of a camera. The camera may be of any type as long as the camera has an image stabilization function, including a consumer digital camera, a professional camera, a mobile phone with a camera function, or a camera of a smartphone, and the like.

In addition, the camera shake measurement method of the present disclosure can be used not only for evaluation of a blur of an image but also for camera shake evaluation about other images. For example, the camera shake measurement method of the present disclosure can be used for camera shake evaluation about a shot image by providing the camera with such a system. The camera may be of any type as long as the camera has a hand shake correcting function, including a consumer digital camera, a professional camera, a mobile phone with a camera function, or a camera of a smartphone, and the like.

As presented above, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

What is claimed is:

1. A measurement method for a bokeh amount of an image, the measurement method comprising:
acquiring an image signal by imaging an object with a camera, the object including a first color area composed of a first color, and a second color area which is composed of a second color different from the first color and is adjacent to the first color area;
acquiring a first level value that is a level value of the image signal in the first color area;
acquiring a second level value that is a level value of the image signal in the second color area;
calculating a difference between the first level value and the second level value;
calculating a first corrected level value by adding X % of the calculated difference to the first level value;
calculating a second corrected level value by subtracting Y % of the calculated difference from the second level value;
specifying a first corrected level position and a second corrected level position at a boundary between the first color area and the second color area included in the acquired image signal, the first corrected level position being a position where the level value of the image signal is the first corrected level value, and the second corrected level position being a position where the level value of the image signal is the second corrected level value;
calculating a distance between the specified first corrected level position and the specified second corrected level position; and
measuring a bokeh amount of the image at the boundary between the first color area and the second color area by multiplying the calculated distance by 100/(100−X−Y),
wherein the following conditions (1), (2), and (3) are satisfied:

$$0<X \quad (1)$$

$$0<Y \quad (2)$$

$$X+Y<100 \quad (3).$$

2. The measurement method for a bokeh amount of an image, according to claim 1, wherein a level value indicated by the acquired image signal is normalized with reference to a specific range, and the normalized level value is used as the level value of the image signal.

3. A measurement apparatus comprising:
an image acquiring section configured to acquire an image signal generated by imaging of an object with a camera, the object including a first color area composed of a first color, and a second color area which is composed of a second color different from the first color and is adjacent to the first color area;
a first level value acquiring section configured to acquire a first level value that is a level value of the image signal in the first color area;
a second level value acquiring section configured to acquire a second level value that is a level value of the image signal in the second color area;
a difference calculation section configured to calculate a difference between the first level value and the second level value;
a first corrected level value calculation section configured to calculate a first corrected level value by adding X % of the calculated difference to the first level value;
a second corrected level value calculation section configured to calculate a second corrected level value by subtracting Y % of the calculated difference from the second level value;
a specifying section configured to specify a first corrected level position and a second corrected level position at a boundary between the first color area and the second color area included in the acquired image signal, the first corrected level position being a position where the level value of the image signal is the first corrected level value, and the second corrected level position being a position where the level value of the image signal is the second corrected level value, as a second corrected level position;

a distance calculation section configured to calculate a distance between the specified first corrected level position and the specified second corrected level position; and a bokeh amount measurement section configured to measure a bokeh amount of the image at the boundary between the first color area and the second color area by multiplying the calculated distance by $100/(100-X-Y)$, wherein the following conditions (1), (2), and (3) are satisfied:

$$0<X \tag{1}$$

$$0<Y \tag{2}$$

$$X+Y<100 \tag{3}.$$

4. The measurement apparatus according to claim 3, further comprising a normalization section configured to normalize a level value indicated by the acquired image signal with reference to a specific range, and use the normalized level value as the level value of the image signal.

5. A non-transitory computer readable recording medium having stored therein a computer program for causing a computer to:

acquire an image signal by imaging of an object with a camera, the object including a first color area composed of a first color, and a second color area which is composed of a second color different from the first color and is adjacent to the first color area;

acquire a first level value that a the level value of the image signal in the first color area;

acquire a second level value that a the level value of the image signal in the second color area;

calculate a difference between the first level value and the second level value;

calculate a first corrected level value by adding X % of the calculated difference to the first level value;

calculate a second corrected level value by subtracting Y % of the calculated difference from the second level value;

specify a first corrected level position and a second corrected level position at a boundary between the first color area and the second color area included in the acquired image signal, the first corrected level position being a position where the level value of the image signal is the first corrected level value, and a second corrected level position being a position where the level value of the image signal is the second corrected level value, as a second corrected level position;

calculate a distance between the specified first corrected level position and the specified second corrected level position; and measure a bokeh amount of the image at the boundary between the first color area and the second color area by multiplying the calculated distance by $100/(100-X-Y)$, wherein the following conditions (1), (2), and (3) are satisfied:

$$0<X \tag{1}$$

$$0<Y \tag{2}$$

$$X+Y<100 \tag{3}.$$

6. The non-transitory computer readable recording medium according to claim 5, further causing the computer to normalize a level value indicated by the acquired image signal with reference to a specific range, so that the normalized level value is used as the level value of the image signal.

7. A camera comprising:

an image acquiring section configured to acquire an image signal by imaging an object with a camera, the object including a first color area composed of a first color, and a second color area which is composed of a second color different from the first color and is adjacent to the first color area;

a first level value acquiring section configured to acquire a first level value that is a level value of the image signal in the first color area;

a second level value acquiring section configured to acquire a second level value that is a level value of the image signal in the second color area;

a difference calculation section configured to calculate a difference between the first level value and the second level value;

a first corrected level value calculation section configured to calculate a first corrected level value by adding X % of the calculated difference to the first level value;

a second corrected level value calculation section configured to calculate a second corrected level value by subtracting Y % of the calculated difference from the second level value;

a specifying section configured to specify a first corrected level position and a second corrected level position at a boundary between the first color area and the second color area included in the acquired image signal, the first corrected level position being a position where the level value of the image signal is the first corrected level value, and the second corrected level position being a position where the level value of the image signal is the second corrected level value, as a second corrected level position;

a distance calculation section configured to calculate a distance between the specified first corrected level position and the specified second corrected level position; and a bokeh amount measurement section configured to measure a bokeh amount of the image at the boundary between the first color area and the second color area by multiplying the calculated distance by $100/(100-X-Y)$, wherein the following conditions (1), (2), and (3) are satisfied:

$$0<X \tag{1}$$

$$0<Y \tag{2}$$

$$X+Y<100 \tag{3}.$$

8. The camera according to claim 7, further comprising a normalization section configured to normalize a level value indicated by the acquired image signal with reference to a specific range, and use the normalized level value as the level value of the image signal.

* * * * *